(12) United States Patent
Firey

(10) Patent No.: US 7,334,390 B2
(45) Date of Patent: Feb. 26, 2008

(54) MIXED FUEL COAL BURNER FOR GAS TURBINES

(76) Inventor: Joseph Carl Firey, P.O. Box 15514, Seattle, WA (US) 98115-0514

( * ) Notice: Subject to any disclaimer, the term of this patent is extended or adjusted under 35 U.S.C. 154(b) by 85 days.

(21) Appl. No.: 11/442,728

(22) Filed: May 30, 2006

(65) Prior Publication Data

US 2007/0079594 A1   Apr. 12, 2007

Related U.S. Application Data

(63) Continuation-in-part of application No. 11/103,228, filed on Apr. 12, 2005, now abandoned.

(60) Provisional application No. 60/646,158, filed on Jan. 24, 2005.

(51) Int. Cl.
*F02C 3/28* (2006.01)
(52) U.S. Cl. .................................. 60/39.12; 60/39.464
(58) Field of Classification Search ............. 60/39.12, 60/39.281, 39.464; 48/78; 202/91
See application file for complete search history.

(56) References Cited

U.S. PATENT DOCUMENTS 2,727,813 A * 12/1955 Leffer ..................... 48/197 R
3,702,516 A * 11/1972 Luckenbach ................ 48/206
4,270,467 A *  6/1981 Drake ....................... 110/216
4,331,529 A *  5/1982 Lambert et al. ............ 208/410

* cited by examiner

*Primary Examiner*—L. J. Casaregola

(57) ABSTRACT

As shown schematically in FIG. 1, hot gases, containing molecular oxygen, from generator elements, (14) and (19), pass through a bed of coal chunks in an ODD reactor chamber (2). The molecular oxygen content of these hot gases is less than stoichiometric, relative to the coal volatile matter content, so that partial oxidation of only the volatile matter occurs within the ODD reactor chamber, (2), during devolatilization therein. Two products are thusly created, a partially oxidized, and hence cleaner burning, volatile matter fuel gas, and a solid devolatilized coke. The hot coke is transferred, by overfeed, into a coke reaction chamber, (7), where counterflowing primary air, via air meter, (12), gasifies the coke into carbon monoxide with some carbon dioxide. Finally, the carbon monoxide and the partially oxidized volatile matter, are admixed with overfire air, and burned fully to carbon dioxide in overfire burner chambers, (23), (26). The resulting hot burned gases flow into the nozzle inlet, where, after mixing with bypass air, they expand through the expander portion of a gas turbine engine. Coal ashes accumulate at the bottom, (9), of the coke reaction chamber, (7), where the overlying coke chunks prevent ash particle carryover into the turbine blades. Low cost coal can thus be cleanly used as an energy source for gas turbine engines.

6 Claims, 11 Drawing Sheets

SECTION B-B OF FIGURE 8

MIXED FUEL COAL BURNER FOR GAS TURBINES

CROSS REFERENCES TO RELATED APPLICATIONS

This U.S. patent application is a continuation-in-part of my earlier filed U.S. patent application, entitled, Mixed Fuel Coal Burner for Gas Turbine Engines, Ser. No. 11/103,228, filing date, 12 Apr. 2005 now abandoned, Joseph Carl Firey, inventor, confirmation number 5787.

This application is also related to my earlier filed Provisional U.S. Patent Application entitled, Mixed Fuel Coal Burner for Gas Turbine Engines, Ser. No. 60/646,158, filing date 24 Jan. 2005, Joseph Carl Firey, inventor, confirmation number 3420.

This application is also related to my earlier filed International Patent Application Request, filed under the provisions of the Patent Cooperation Treaty, entitled, Mixed Fuel Coal Burner for Gas Turbines, Serial number PCT/US2006/000867, filing date 12 Jan. 2006, Joseph Carl Firey, inventor.

BACKGROUND OF THE INVENTION

This invention is in the technical field of coal burners for furnaces and gas turbine engines.

Prior efforts to burn coal in gas turbine engines, such as by use of pulverized coal, or coal in water slurries, have been unsatisfactory due to turbine blade maintenance problems, caused by coal ash particles being carried into the turbine blades, with the hot gases flowing therethrough.

As a result, gas turbine engines, such as are used for electric power generation in combined cycle plants, today burn natural gas, or petroleum distillate fuels, and these fuels are increasingly in short supply, and thus expensive.

As of October 2004, coal cost is about one-fifth of natural gas cost, per unit of energy. Known coal reserves are much greater than known petroleum and natural gas reserves, both nationally, and internationally.

The following United States patents were cited by Examiner Louis Casaregola as relevant to my earlier filed, herein cross referenced, U.S. patent application Ser. No. 11/103, 228:

U.S. Pat. No. 2,727,813, Leffer, 1955
U.S. Pat. No. 3,702,516, Luckenbach, 1972
U.S. Pat. No. 4,270,467, Drake, 1981
U.S. Pat. No. 4,331,529, Lambert et al, 1982

Applicant considers that these cited references differ from his invention, as described herein, in several ways, as follows:

Leffer, U.S. Pat. No. 2,727,813:

Leffer's oxidative destructive distillation zone, 3, has several similarities to my ODD reactor chamber, in that both react bituminous coal with hot, oxygen containing gas, in order to transform bituminous coal into a coke product, and a gas product. Leffer uses small, comminuted coal particles, descending, under gravity, against a counterflowing hot oxygen containing gas, in order to carry out his oxidative destructive distillation process in his reactor chamber, 3. As a result, the descending devolatized coke has first call on the oxygen in the hot gases, and carbon oxides are produced. Leffer's gas product, from reactor chamber, 3, thus contains carbon oxides, unoxidized hydrocarbons, and steam, as described in column 5, lines 40 through 46.

In my ODD reactor chamber, 2, large coal chunks form an essentially fixed coal and coke bed, with intermittent upward motions, at each refuel interval. The hot oxygen containing gas flows through this fixed bed in the same direction as the coal motion. As a result the emerging volatile matter has first call on the oxygen in the hot oxygen containing gases and partially oxidized volatile matter is produced. My gas product from ODD reactor chamber, 2, thus contains partially oxidized, and hence clean burning, volatile matter and inert gases, remaining from the hot, originally oxygen containing, gases.

Leffer seeks to strip the hydrogen from the volatile matter, and deposit the carbon on coke and ash particles, in order to create a synthesis gas product, rich in hydrogen and carbon monoxide. This he accomplished by passing the gaseous product of destructive distillation, from his oxidative destructive distillation reaction, 3, into his gas cracking and reducing reactor, 8, where volatile matter is cracked further to hydrogen gas and carbon, and carbon dioxide is reduced to carbon monoxide. Leffer achieves a different result from his oxidative destructive distillation than I achieve from my ODD reactor chamber.

Luckenbach and Lambert et al; U.S. Pat. Nos. 3,702,516 and 4,331,529

These two inventions describe very similar reactors and reaction processes.

Luckenbach's coker zone, 4, and Lambert's coker reactor, 1, carry out a destructive distillation process, when coal is supplied into them, but not an oxidative destructive distillation reaction, as I do in my ODD reactor chamber, since their fluidizing gas, passing upwardly through these cokers, is free of oxygen molecules. Lambert states that steam is the fluidizing gas in his coker, 1. Luckenbach does not clearly state what fluidizing gas he admits into his coker, 4, at bottom inlet, 5, but it must be free of oxygen molecules as otherwise rapid burning of hydrocarbons and coke would occur in this coker, 4, contrary to Luckenbach's descriptions of the reactions occurring therein.

The reactions in my coke reaction chamber are similar to the reactions in Lambert's first gasifier, 3, and Luckenbach's gasifier, 17, in that the coke supplied thereinto is to be fully oxidized into gaseous products, and solid ashes, by use of reactant gases containing molecular oxygen.

I use large coke chunks in a deep and essentially fixed coke bed in order to produce large ash particles which can be retained by the deep coke bed in my coke reaction chamber, and thus are not carried over into the gas turbine engine blades.

Lambert and Luckenbach use very small coke particles, in a fluidized bed, in order to achieve high reaction rates, and thus use small volume reactor pressure vessels. The inevitable carryover of ash particles is reactified by use of cyclone separators, 23, 36, 38.

In gas turbine engine applications, such use of gas-particle separators, to remove ash particles from combustion gases, has proven unsatisfactory. Several years ago the American railroads jointly carried out a research and development program to use pulverized coal burners, on gas turbine engines, for railroad locomotive power. The gas pressure drop across cyclone separators, required to adequately remove the fly ash particles, unacceptably reduced the efficiency of the gas turbine engine.

Drake, U.S. Pat. No. 4,270,467

Drake uses an essentially conventional cross flow stoker, 6, to burn solid waste fuel materials fully to carbon dioxide reacted gas. I use a counterflow of coke and burner air, in a deep coke fuel bed, with a lengthy carbon dioxide reaction zone, in order to react coke largely to carbon monoxide.

SUMMARY OF THE INVENTION

In a mixed fuel coal burner of this invention, coal chunks pass through two separate reaction chambers in series. In the first, ODD, reactor chamber the coal is heated by a through-flow of hot gas, containing some molecular oxygen, in order to carry out oxidative destructive distillation, ODD, of the coal volatile matter. The molecular oxygen content of these hot gases is less than stoichiometric, relative to the coal volatile matter, so that partial oxidation of only the volatile matter occurs in the ODD reactor chamber. Two fuel products thus emerge from the ODD reactor chamber; a devolatilized coke product, which is passed into the second coke reaction chamber; and a partially oxidized coal volatile matter gas. The partially oxidized coal volatile matter gas is mixed with an overfire air, and fully burned, in an ODD overfire burner chamber, and the resulting burned gases pass into the turbine. Partially oxidized volatile matter can thus be burned cleanly in the ODD overfire burner chamber, with greatly reduced creation of undesirable soot or tar, and this is one of the beneficial objects of this invention.

The devolatilized coal chunks are delivered, by overfeed, into the top, or gas exit end of a bed of hot burning coke, in the second coke reaction chamber. Primary air flows upward through the coke reaction chamber and countercurrent to the coke chunk flow direction. The coke reacts rapidly with oxygen in the counterflowing primary air, and the resulting very hot burned gases quickly heat up entering coke chunks by convective heat transfer. The coke is thus burned up rapidly, and completely, to carbon monoxide and carbon dioxide while passing through the coke reaction chamber. This coke burn rate is proportional to the rate of supply of primary air into the coke reaction chamber. Thus the power output of a gas turbine engine, using this mixed fuel coal burner, can be controlled by control of the primary air flow rate into the coke reaction chamber, over a very wide range of engine power output, and corresponding coal burn rates.

The exit gases from the second coke reaction chamber are rich in carbon monoxide fuel, and these are mixed with additional overfire air, and burned fully to carbon dioxide, in a carbon monoxide overfire burner chamber, and these fully burned gases flow into the turbine inlet nozzles.

Prior art underfeed coal burners used a single reaction chamber to achieve similar clean burning of high volatile matter bituminous coals. With these underfeed burners, the coal and primary air moved in the same direction through the reactor. As a result, the fresh coal volatile matter evaporates into the oxygen rich incoming primary air. In this way the evaporating volatile matter receives the partial oxidation, needed for clean burning thereof, without soot and tar formation. But the entering coal chunks are heated up to rapid burning temperatures, by slow radiation heat transfer between chunks, and not by rapid convective heat transfer from hot burned gases. This radiation heat transfer rate, and hence the coal burn rate, is not only slow, but cannot be controlled by control of the primary air flow rate, as is needed for control of the power output of a gas turbine engine.

This is another beneficial object of this invention, over the prior art, that high volatile matter bituminous coals can be burned cleanly, at a high burn rate, and that this burn rate can be controlled, over a wide range, by control of the rate of flow of primary air into the second coke reaction chamber.

With overfeed supply of coal chunks into the coke reaction chamber, final coke burnup to ashes occurs at the bottom of the second, coke reaction chamber, and the ash particles, which are smaller than the coal chunks, are restrained from being blown out of the coke reaction chamber, and into the gas turbine engine, by the overlying coke bed. With prior art, underfeed coal burners, the small ash particles are formed at the top of the fuel bed, and can thus be blown out of the fuel bed, and into the gas turbine engine, resulting in turbine blade damage.

It has been this carryover of ash particles, into the gas turbine engine, and resulting turbine blade damage, which has previously prevented the use of low cost, and readily available, coal fuels in gas turbine engines. At present, gas turbine engines, such as are widely used in combined cycle electric power generating plants, operate only on expensive natural gas, or petroleum distillate fuels. This is a principal beneficial object of this invention, that low cost, ash containing, coals can be cleanly burned, in a gas turbine engine, without ash carryover into the turbine blades.

A mixed fuel coal burner of this invention can additionally comprise a supplementary fuel air mixture overfire burner chamber, which burns a gas or liquid fuel, such as natural gas, in the overfire space, above the coke fuel bed. This supplementary fuel burner can be used to control gas turbine engine speed very closely, as such burners can respond quickly to speed changes. The coal burner, while readily governable, responds slowly to speed changes, whereas in most applications, such as electric power generation, very close speed control is needed.

This supplementary fuel air mixture overfire burner chamber, also provides a method for adjusting the relative fuel quantities being used by the gas turbine engine, and these quantities can then be changed, in response to changes in fuel prices and availability.

A modified form of the mixed fuel coal burner of this invention, can be used to transform coals, containing volatile matter, into two different fuel products, a partially oxidized volatile matter, clean burning gas fuel, and a devolatized solid coke fuel. These fuels can then be utilized separately in other applications.

BRIEF DESCRIPTION OF THE DRAWINGS

A schematic diagram of an example form of mixed fuel coal burner, of this invention, is shown in FIG. 1.

Figure 3:
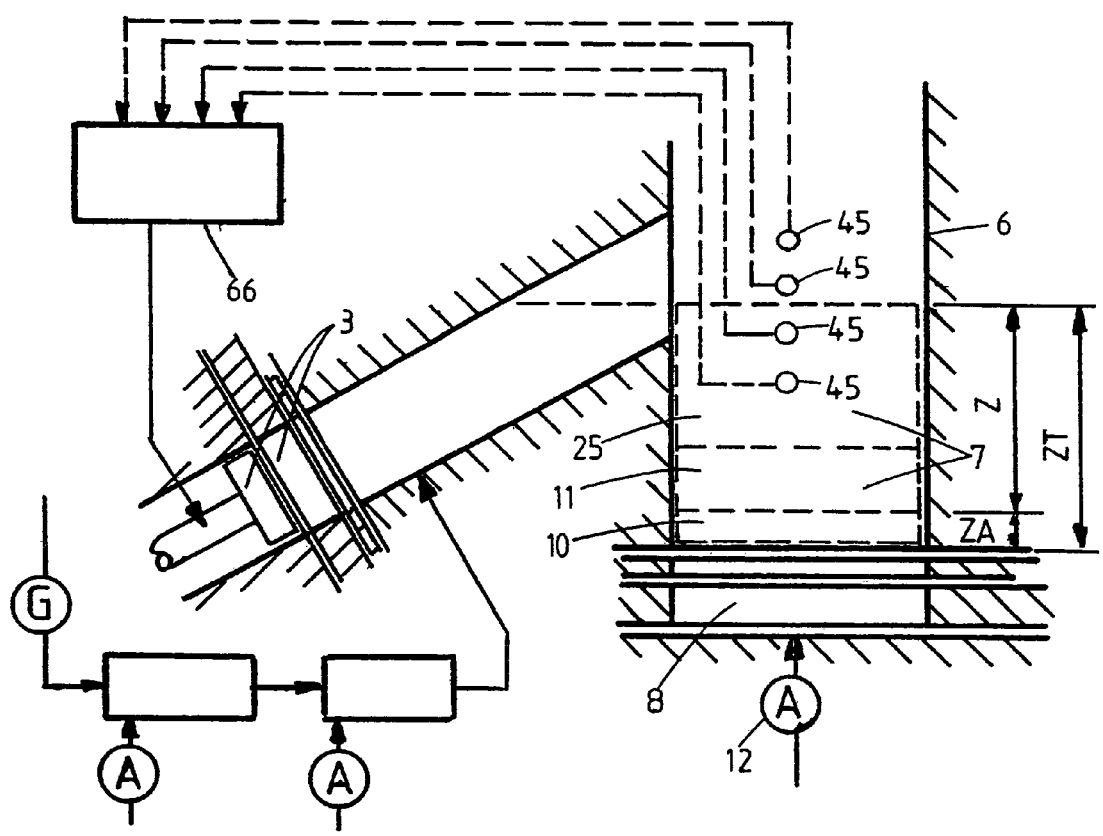

Additional related controls are shown schematically on FIG. 3.

Figure 4:
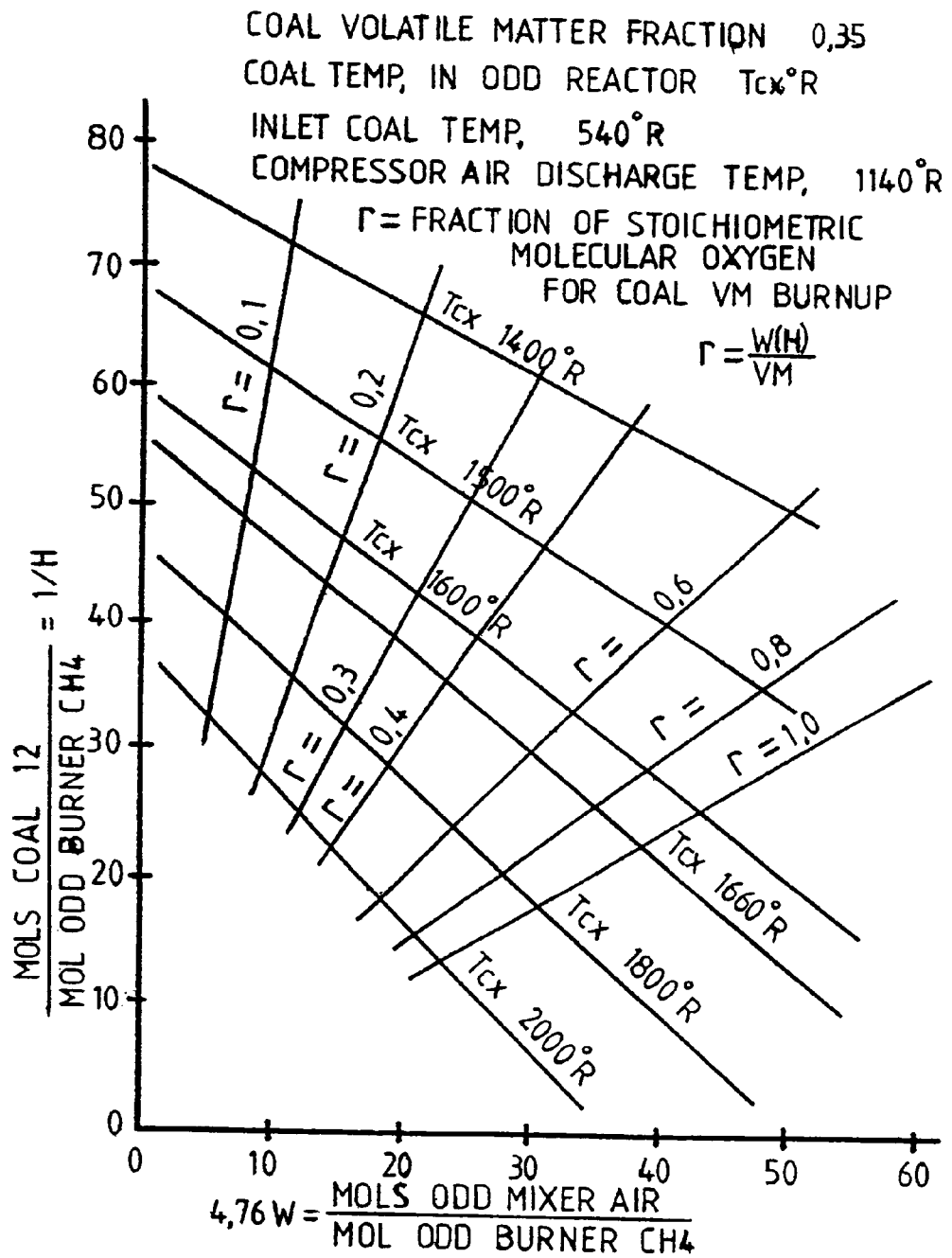

The preferred operating regions, for the ODD reactor portion, of a mixed fuel coal burner of this invention, are shown graphically in FIG. 4.

Figure 5:
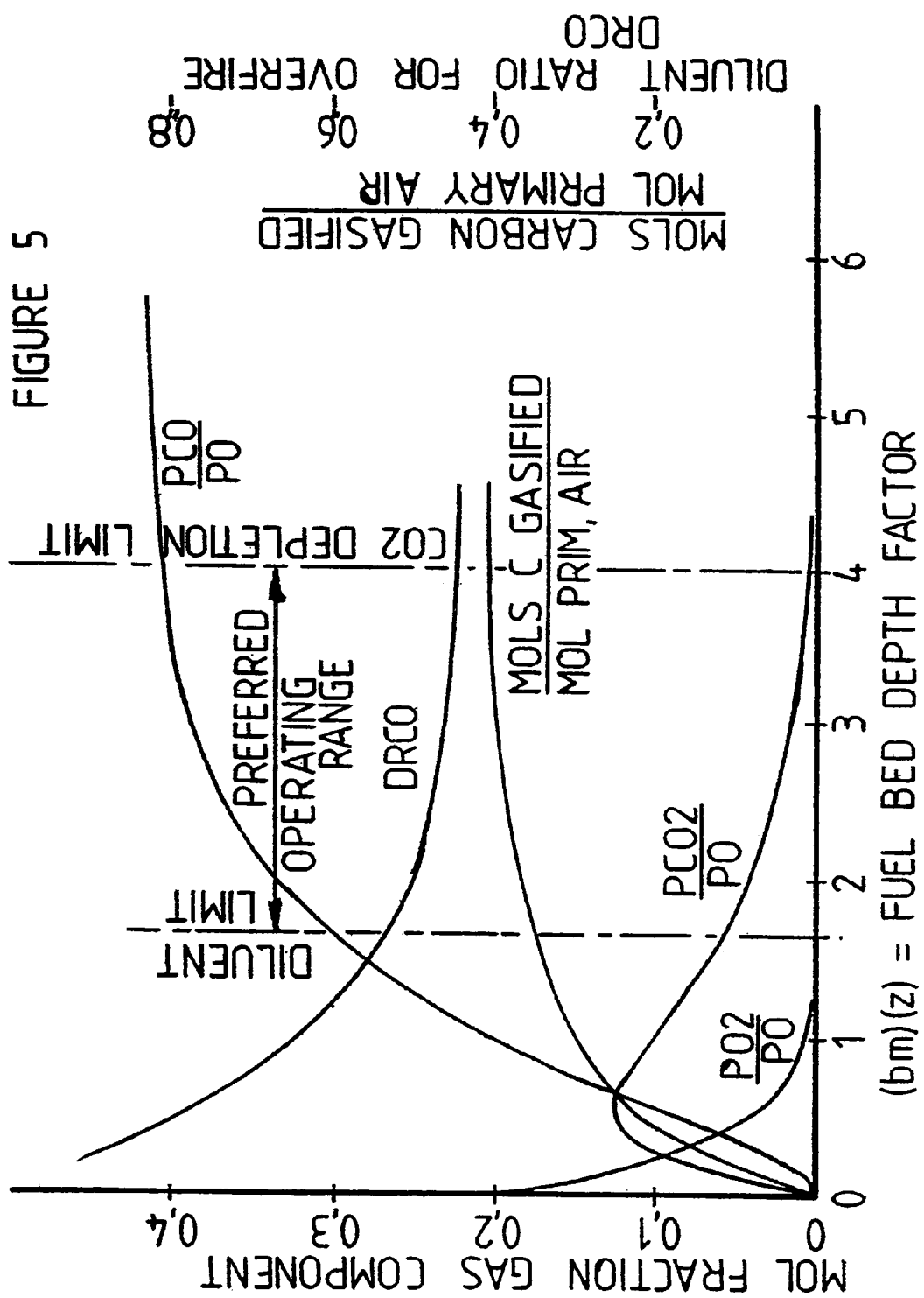

The preferred operation regions for the coke reaction chamber portion, of a mixed fuel coal burner of this invention, are shown graphically in FIG. 5.

Figure 6:
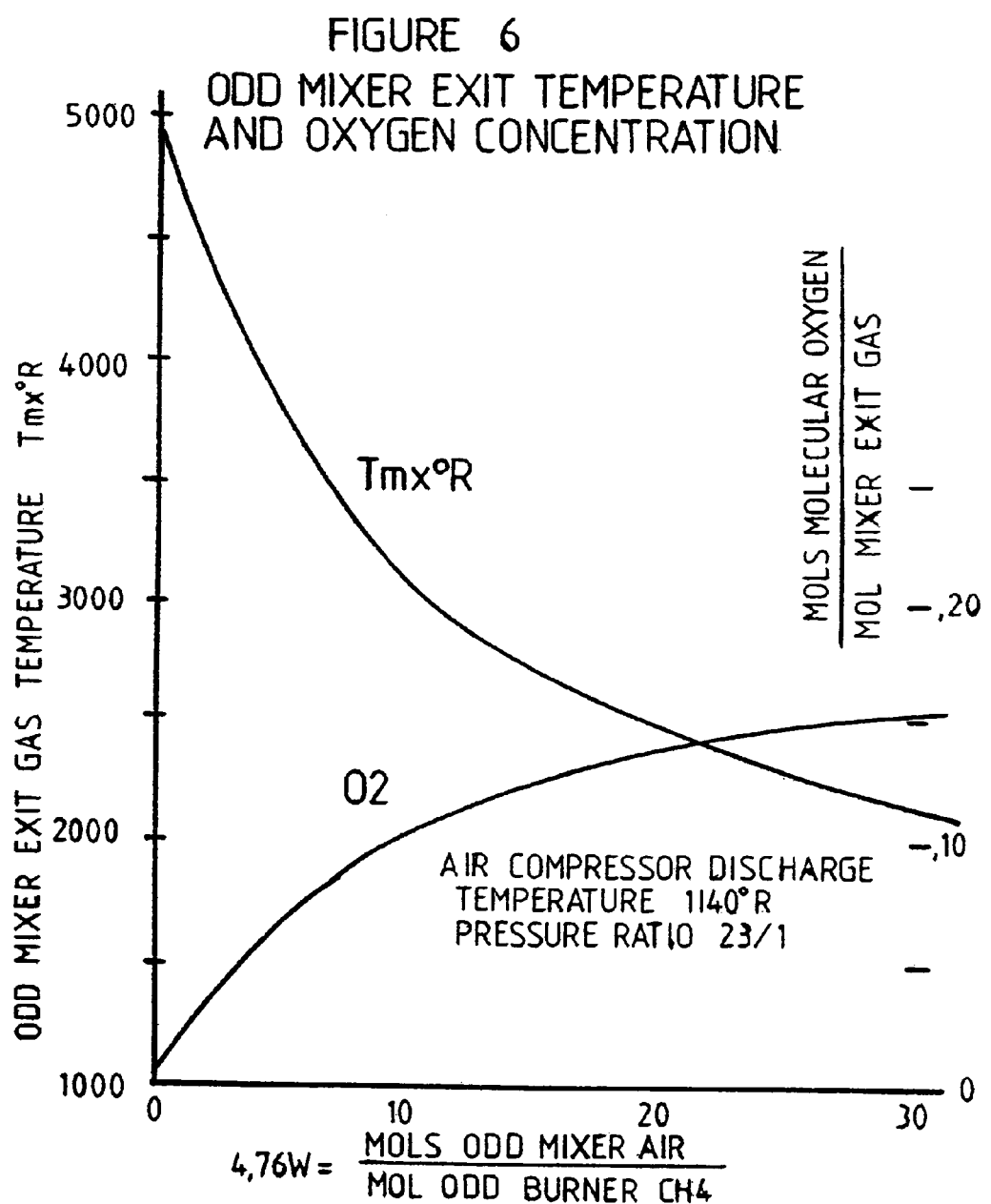

The operating characteristics of an example generator of hot molecular oxygen containing gases is shown graphically on FIG. 6.

Figure 7:
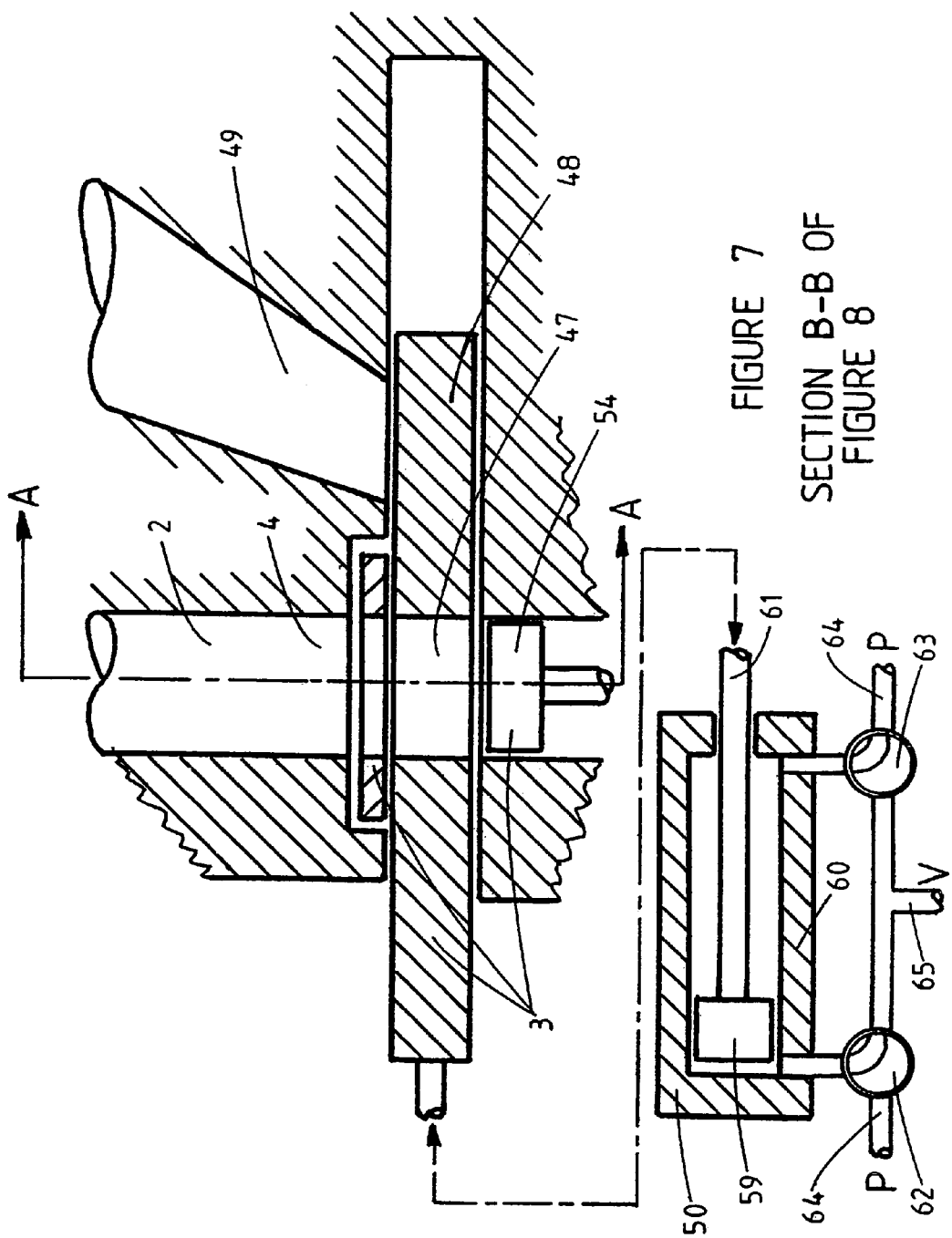
Figure 8:
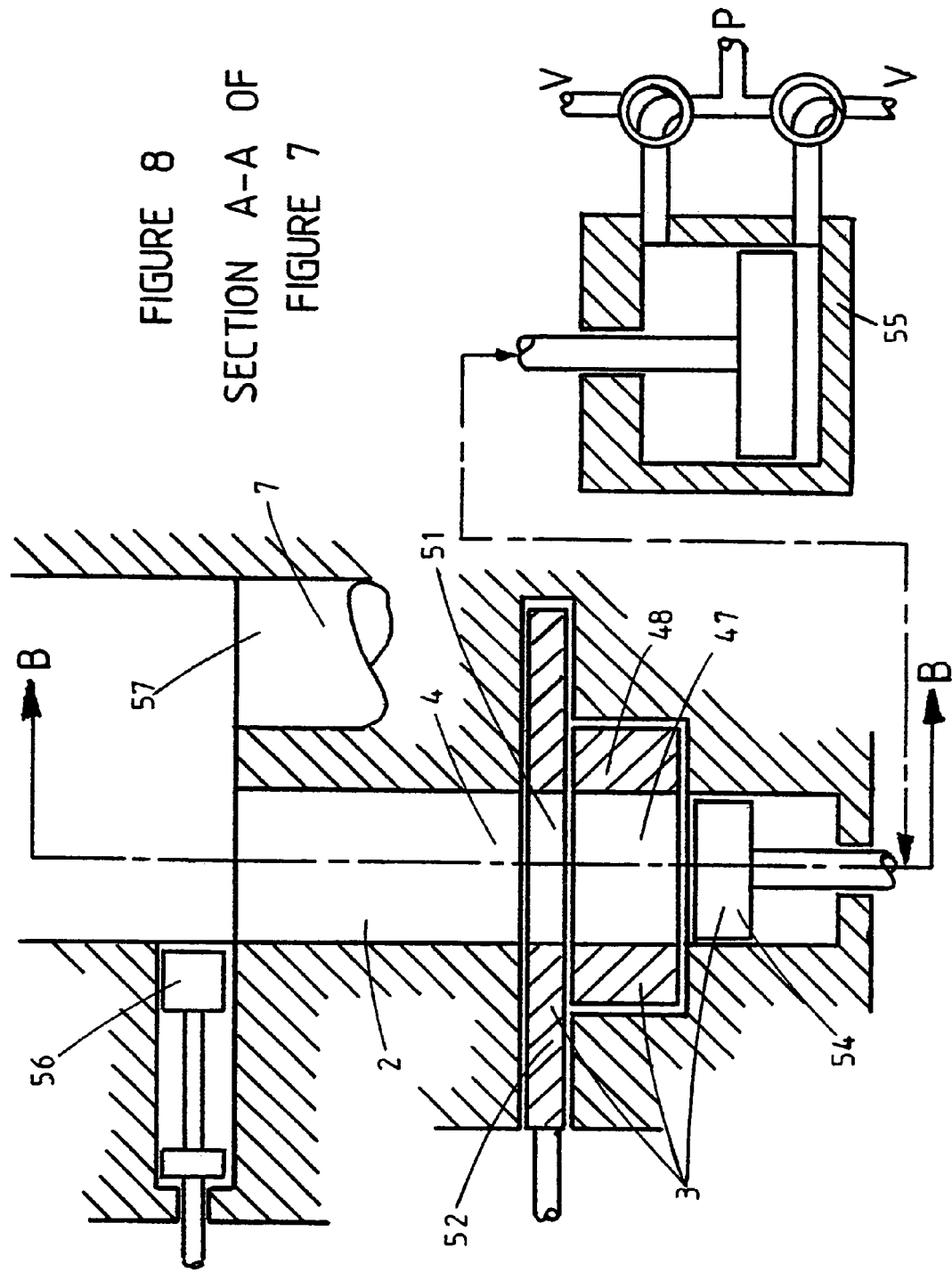

An example refuel mechanism for use on a mixed fuel coal burner is shown schematically in FIGS. 7 and 8. FIG. 8 is the cross section, A-A, of FIG. 7. FIG. 7 is the cross section, B-B, of FIG. 8.

Figure 9:
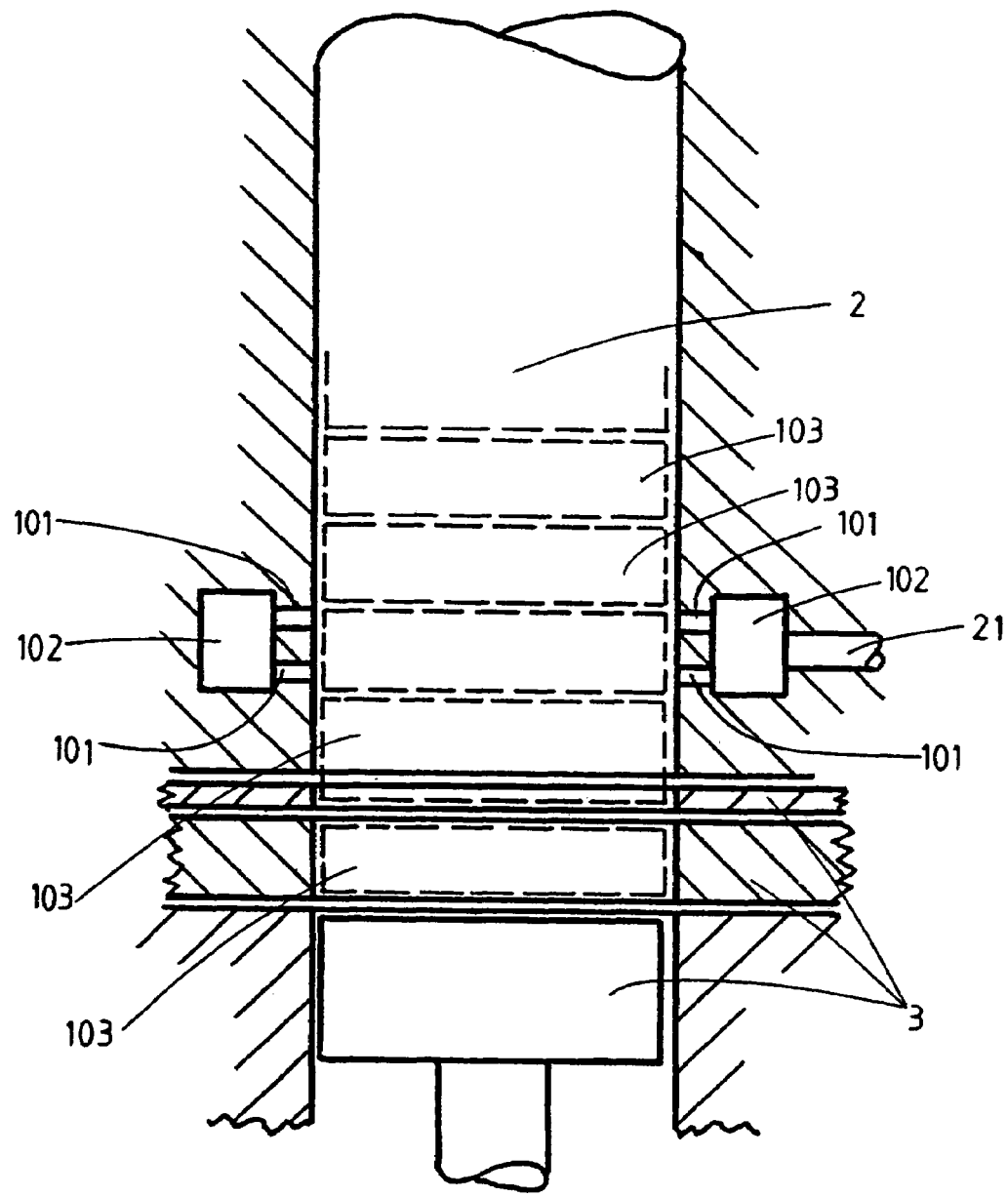

An example gas manifold and inlet ports system for admitting hot molecular oxygen containing gases into an ODD reactor chamber is shown in cross section in FIG. 9.

Figure 10:
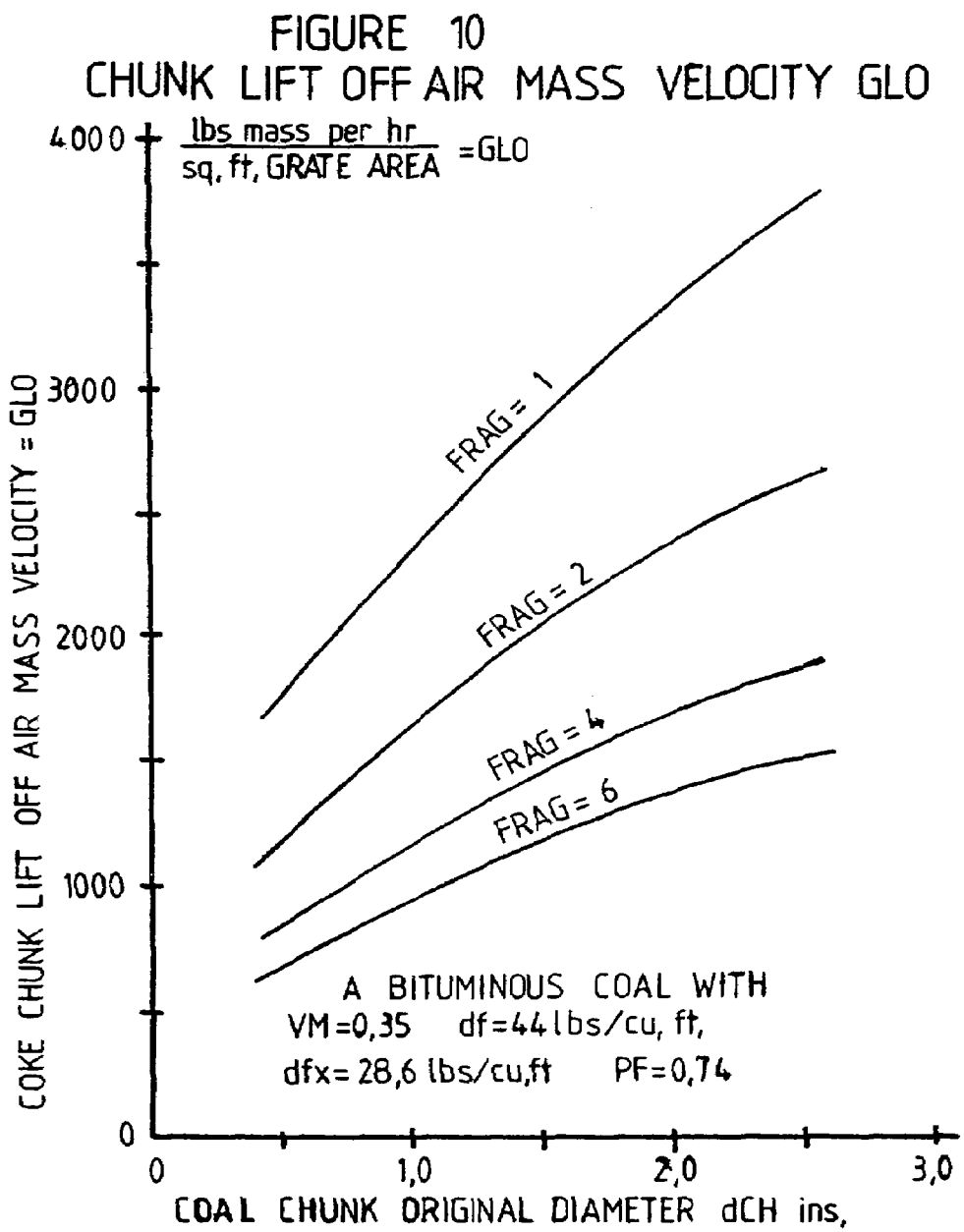

The effects of coal chunk size, and fragmentation, on chunk lift off limited air mass velocities, through the ODD reactor chamber, and coke reaction chamber, are shown graphically on FIG. 10.

Figure 11:
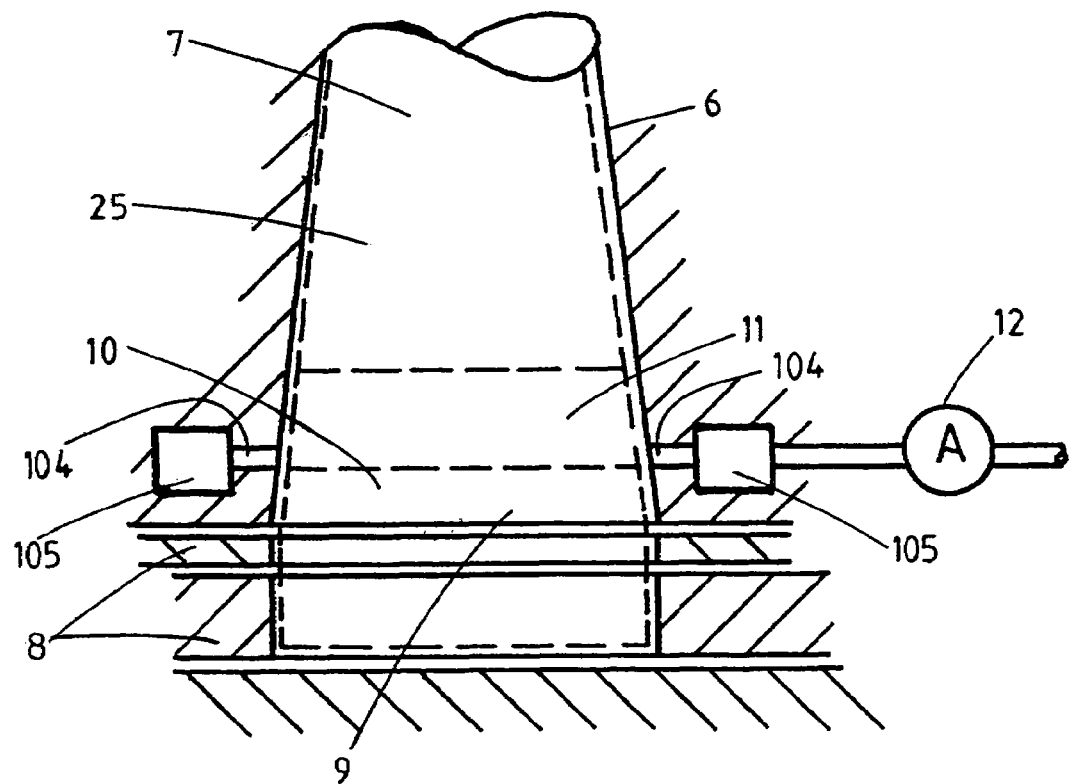

An example air manifold and inlet ports system for admitting primary air into the coke reaction chamber, is shown in cross section in FIG. 11.

None of the apparatus drawings are to scale.

DESCRIPTION OF THE PREFERRED EMBODIMENTS

Figure 1:
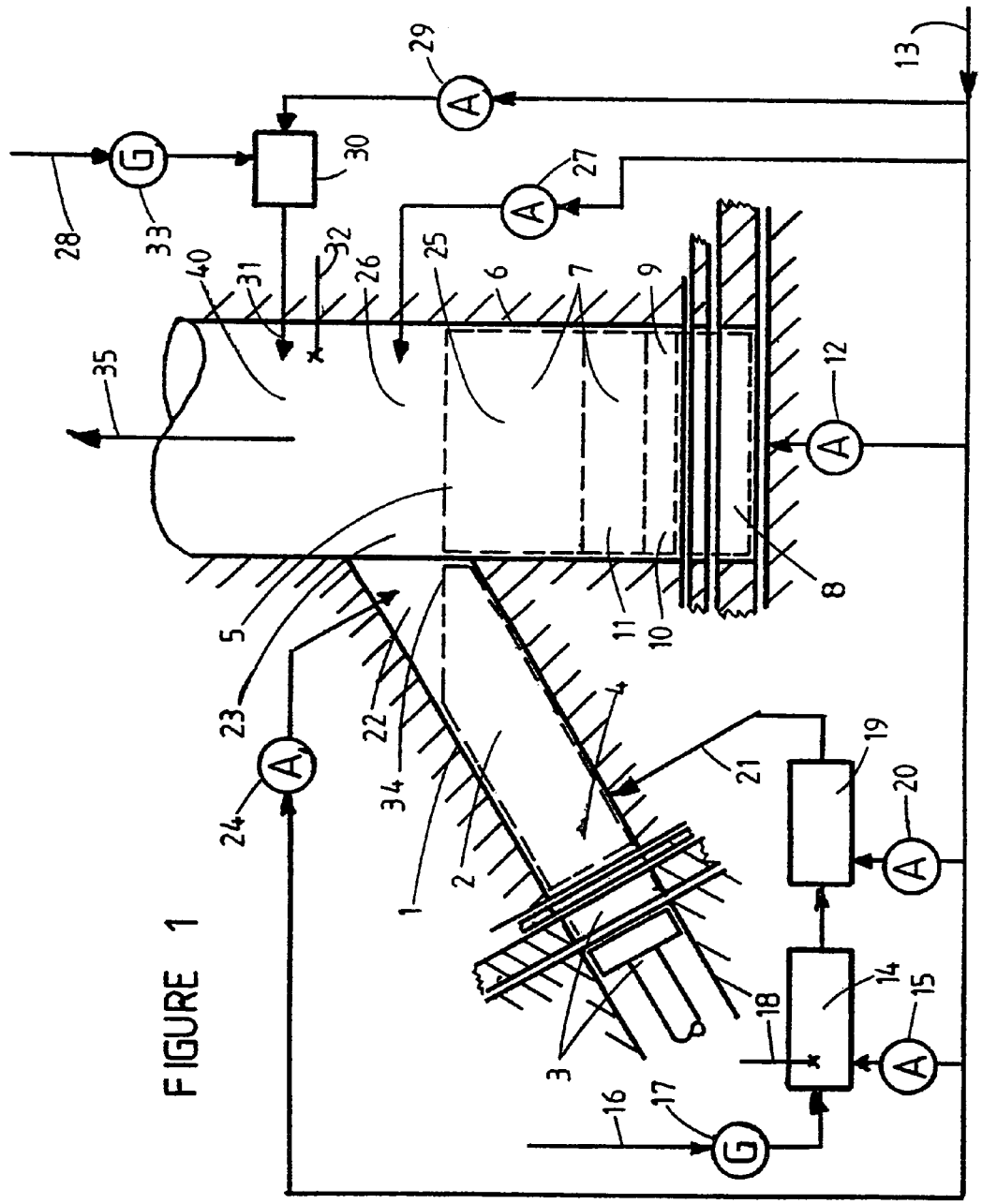

One example form of a mixed fuel coal burner of this invention is shown schematically in FIG. 1, as adapted for use with a gas turbine engine, and comprises the following elements:

1. The oxidative, destructive distillation, ODD, reactor comprises an ODD reactor chamber, 2, and enclosure, 1, and a refuel mechanism and driver, 3. The refuel mechanism can transfer coal chunks, periodically, from an external coal supply source, at atmospheric pressure, not shown, sealably into the pressurized lower refuel end, 4, of the ODD reactor chamber, 2. The refuel mechanism, 3, functions thusly to keep the ODD reactor chamber, 2, essentially full of coal undergoing oxidative destructive distillation. Excess coal, reacted to coke, spills out of the upper gas outlet end of the ODD reactor chamber, 2, at each refueling, into the upper end, 5, of the coke reaction chamber, 7, which utilizes overfeed coke fuel delivery.

2. A portion of the gas turbine engine compressor discharge air is delivered into the ODD burner chamber, 14, of a hot gas generator, via the positive displacement ODD burner air supply meter, 15, from the compressor air pipe, 13, and is admixed therein with a gaseous fuel, such as natural gas, delivered under adequate pressure, from a source, 16, via the positive displacement ODD burner fuel supply meter, 17. The resulting essentially stoichiometric fuel air mixture is ignited, as by a spark, 18, and burns within the ODD burner chamber, 14. The resulting very hot burned gases pass into the ODD mixer chamber, 19, and therein, are admixed with another mixer portion of gas turbine engine compressor discharge air, delivered from the compressor air pipe, 13, via the positive displacement ODD mixer air supply meter, 20. The resulting hot mixed gases, containing some molecular oxygen, are delivered into the lower end of the ODD reactor chamber, 2, via a manifold, 21, and move through the coal chunks therein, upward in the same general direction as the direction of coal movement.

The hot molecular oxygen containing mixer exit gases are ideally admitted uniformly over the ODD reactor chamber cross sectional area. But this uniform admission would require a flow of these hot gases through the refuel mechanism, 3, with resulting maintenance problems on the refuel mechanism. A compromise plan is to admit the hot mixer exit gases peripherally into the ODD reactor chamber, 2, via several ports, 101, distributed peripherally around the chamber, from a supply manifold, 102, as illustrated in FIG. 9. These gas admission ports, 101, are preferably somewhat above the refuel mechanism, 3, by at least one refuel package, 103, in order to insulate the refuel mechanism, 3, from the hot mixer exit gases flowing through the ODD reactor chamber.

With peripheral admission of hot mixer exit gas, into the ODD reactor chamber, as illustrated in FIG. 9, coal chunks, in the reactor center, will receive mixer exit gas partially depleted of molecular oxygen, by flow through outer coal chunks. This could result in a possible increased yield of soot and tar from these central coal chunks. This effect becomes aggravated as ODD reactor cross section area is increased. By using two or more ODD reactor chambers, 2, for each coke reaction chamber, 7, the area of each ODD reactor chamber can be reduced, and the formation of soot and tar reduced.

3. The coal chunks in the ODD reactor chamber are heated up, by direct contact convective heat transfer, from the hot mixer exit gases passing through, to temperatures where rapid distillation of the coal volatile matter occurs. At coal temperatures above 1500° R., the coal also undergoes a complex thermal cracking process of destructive distillation. Such destructive distillation, in the presence of less than stoichiometric molecular oxygen, relative to the created volatile matter, leads to partially oxidized gaseous volatile matter products. These partially oxidized volatile matter fuels, when subsequently burned with added overfire air, burn cleanly, with little or no formation of soot or tar.

For the purposes of this invention, the flow rate of molecular oxygen into the ODD reactor chamber, 2, via the hot mixer exit gas, is to be less than stoichiometric, relative to the flow rate of coal volatile matter, into the ODD reactor chamber, 2, via the refuel mechanism, 3. Details for achieving this result are described hereinbelow in the ODD reactor sizing section.

But volatile matter molecules, not thusly partially preoxidized, are known to create soot and tar when burned. This is one of the beneficial objects of this invention, that coals, containing appreciable volatile matter, such as bituminous coals, can be burned cleanly, with little or no formation of soot or tars, by applying this oxidative destructive distillation, ODD, process to the coal chunks within the ODD reactor chamber.

4. Prior art, underfeed stoker, coal burners achieved similar essentially soot and tar-free burning, of high volatile matter bituminous coals, by use of essentially this same oxidative destructive distillation process, achieved by use of underfeed stokers. With underfeed stokers, coal and primary air flow in the same direction, within the burning fuel bed, thus assuring that the needed molecular oxygen is present, at the start of the burning zone where destructive distillation of volatile matter is taking place. But, with underfeed stokers, the burning zone advances into fresh coal by radiation and solid interchunk conduction of heat, and this heat transfer rate is not only slow, but largely independent of the rate of supply of primary air, into the fuel bed. As a result, the rate of coal burning cannot be controlled by control of primary air flow into the fuel bed. For gas turbine engines, the engine power output, and speed, need to be closely and quickly controllable, by control of the fuel burning rate, and hence by control of the rate of flow of a portion of the compressor discharge air into the coal burner. This is another of the beneficial objects of this invention, that the rate of oxidative destructive distillation of bituminous coals, can be controlled by control of the flow of hot molecular oxygen containing mixed gases into the ODD reactor chamber. Therein heat transfer, between these hot mixed gases and the coal chunks, is convective, and thus increases as gas flow rate increases, and is thus controllable.

5. As shown in FIG. 1, the ODD reactor enclosure, 1, can be inclined, so that the coal chunks fully occupy the cross section of the ODD reactor chamber, 2, thus assuring that the hot mixer gas cannot bypass the coal fuel bed. At large angles of ODD reactor enclosure inclination from the horizontal, a transfer mechanism can be used to forcibly transfer devolatilized coke chunks, from the ODD reactor chamber upper gas exit, into the upper gas outlet end, 5, of the coke reaction chamber enclosure, 6.

6. The gases flowing out of the exit end, 22, of the ODD reactor chamber, 2, and comprising partially oxidized volatile matter products of destructive distillation, enter the ODD overfire burner chamber, 23. Another portion of the compressor discharge air is delivered into this ODD overfire burner chamber, 23, via the positive displacement ODD overfire burner air supply meter, 24, and mixes with these partially oxidized volatile matter products, to create an ignitable and burnable fuel air mixture. This fuel air mixture can be ignited by various means, such as by the hot devolatilized coke at the ODD reactor chamber exit, 22, and at the upper end, 5, of the coke reaction chamber, 7.

7. Other fluids, such as very highly superheated steam, to which some air or other molecular oxygen source has been added, can be substituted for the ODD burner, 14, and mixer, 19, scheme, for creating a hot molecular oxygen containing gas, for heating the coal in the ODD reactor chamber, 2.

8. The coke reactor comprises a coke reaction chamber, 7, a coke reaction chamber enclosure, 6, and an ash removal mechanism and driver, 8. The ash removal mechanism, 8, can transfer ashes, periodically, from the bottom ash removal end, 9, of the coke reactor chamber, 7, at pressure, sealably into an external ash receiver, at atmospheric pressure, not shown. The ash removal mechanism, 8, functions thusly to remove ashes from the coke reaction chamber, 7, while keeping a protective ash layer, 10, always present between the hot burning coke in the oxygen burn zone, 11, and the ash removal mechanism, 8. The refuel mechanism, 3, is controlled to transfer coal, into the ODD reactor chamber, 2, at a sufficient rate, that the spillover of ODD reacted coke, into the coke reaction chamber, 7, keeps the coke reaction chamber essentially full of coke chunks undergoing reaction with primary air. A portion of the gas turbine engine compressor discharge air is delivered into the coke reaction chamber, 7, via the positive displacement coke burner air supply meter, 12, from the compressor airpipe, 13, and supplies the primary air, which flows through the coke reaction chamber, 7, in a direction countercurrent to the direction of coke movement The coke reaction chamber is thus similar to an overfeed stoker.

The primary air is preferably admitted peripherally into the coke reaction chamber, 7, at several points, 104, distributed peripherally around the chamber from a supply manifold, 105, as shown in FIG. 11. These primary air admission points, 104, are preferably somewhat above the ash removal mechanism, 8, so that the high temperature oxygen burn zone, 11, is separated from the ash removal mechanism, by an insulating layer of ash, 9, located just below the admission points, 104.

If coals which tend to form klinkers are to be used, the coke reaction chamber can be tapered, as shown in FIG. 11, with the cross section area increasing in the direction of coke motion. In this way, downward motion of the coal chunks may not be impeded by klinkers.

With peripheral admission of primary air into the coke reactor as illustrated in FIG. 11, centrally located coal chunks will receive air partially depleted of molecular oxygen by flow through outer coal chunks. These central coal chunks may thus react more slowly than the outer coal chunks and this effect is aggravated as coke reactor chamber cross sectional area is increased. This uneven reaction of coke can be minimized by using two or more coke reaction chambers.

9. The devolatilized coke is delivered into the coke reaction chamber, 7, from the ODD reactor chamber, 2, at a high temperature, well above the coke rapid reaction temperature with air. Rapid reaction of the molecular oxygen, in the throughflowing compressor discharge air portion, with the hot coke surface thus occurs, creating an oxygen burn zone, 11, in the coke reaction chamber, whose principal gas product is carbon dioxide. During startup, this oxygen burn zone advances toward the incoming air, and becomes essentially stationary, on top of the protective ash layer, 10. The available molecular oxygen is almost completely reacted, and largely to carbon dioxide, in this rather thin oxygen burn zone. A carbon dioxide burn zone, 25, is created in the upper portions of the coke fuel bed, where carbon dioxide gases react with the hot coke surface, to form carbon monoxide gases. This reaction of carbon dioxide, with the hot coke surface in the carbon dioxide burn zone, 25, is appreciably slower than the reaction of oxygen with the hot coke surface in the oxygen burn zone, 11, and a thicker carbon dioxide burn zone, 25, is required, in order to achieve appreciable depletion of the carbon dioxide by this surface reaction to form carbon monoxide.

With an adequately deep carbon dioxide burn zone, 25, gases exit from the coke fuel bed via the upper gas outlet end, rich in carbon monoxide, with mol fractions thereof approaching 0.40, and enter the carbon monoxide overfire burn zone, 26.

10. Another portion of the compressor discharge air is delivered into this carbon monoxide overfire burn zone, 26, via the positive displacement carbon monoxide overfire burner air supply meter, 27, and mixes therein, with the exit gases from the coke fuel bed, to form an ignitable and burnable fuel air mixture. This carbon monoxide fuel air mixture can be ignited by various means, such as by the hot devolatilized coke at the upper end, 5, of the coke reaction chamber, 7, or by the adjacent burning fuel air mixture in the ODD overfire burner zone, 23. To assure ignitability and burnability of this carbon monoxide fuel air mixture in the carbon monoxide overfire burn zone, 26, a high carbon monoxide concentration is preferred in the coke fuel bed exit gases, and this can be obtained with adequate depth of the coke fuel bed.

11. As shown in FIG. 1, the ODD overfire burn zone, and the carbon monoxide overfire burn zone, are contiguous, and could be joined into a single combined coal gas overfire burn zone, with a single supply of overfire air.

12. The fully burned gases, from the ODD overfire burner chamber, and the carbon monoxide overfire burner chamber, together with the fully burned gases from a supplementary overfire burner, if used, are admixed with those portions of the compressor discharge air, which bypassed the mixed fuel coal burner, and these combined gases flow into the expander turbine inlet nozzles, and through the gas turbine engine. The expander turbine thus functions as a receiver of hot burned gases.

A mixed fuel coal burner of this invention can alternatively be used in applications other than gas turbine engines, such as boiler furnaces, or process furnaces, where the furnace functions as the receiver of hot burned gases created by the mixed fuel coal burner.

13. The rate of burning of the coke chunks, in the coke reaction chamber, 7, can be fully controlled by control of the rate of supply of primary air, into the coke reaction chamber, via the positive displacement coke burner air meter, 12, since primary air, and coke, flow in opposite directions within the coke reaction chamber, which utilizes overfeed delivery of coke thereinto. With thusly opposed flow directions, the coke temperature in the carbon dioxide burn zone, 25, is maintained very hot, despite the occurrence of the endothermic carbon dioxide reaction with the hot coke to form carbon monoxide, by convective heat transfer from the hot gases, leaving the exothermic oxygen burn zone, 11, and flowing into the endothermic carbon dioxide burn zone, 25.

As primary air flow rate is increased, the stagnant gas film on the hot coke surface is reduced in thickness, with a consequent increase of both the heat transfer rate from the hot gases to the surface, and the rate of diffusion of oxygen and carbon dioxide molecules, and hence reaction with, the hot carbon surface. In this way the rate of burning of coke in the coke reaction chamber, 7, can be controlled by control of the rate of flow of primary air into the reactor.

With overfeed delivery of coke chunks, into the coke reaction chamber, 7, the coke is gradually gasified, as it descends through the reaction chamber, and final coke burnup to ashes occurs at the bottom of the coke fuel bed. The resulting ash particles are much smaller than the coke chunks, but are nevertheless prevented from being blown through the coke reactor, and into the gas turbine engine nozzles and blades, by the overlying bed of coke chunks. With prior art underfeed burners, this final burnup to ashes occurs at the top, gas exit, end of the fuel bed, and the smaller ash particles can be blown over, through the overfire burner, and into the gas turbine engine, resulting in turbine blade damage.

Prior art efforts to burn coal, in gas turbine engines, using underfeed burners, or pulverized coal burners, have been commercially unsuccessful, due to this ash carryover causing turbine blade damage. It is a principal beneficial object of this invention, that high volatile matter, low cost, bituminous coals, can be cleanly burned, in a gas turbine engine, without ash carryover into the turbine blades.

Primary air is delivered into the gas inlet near the bottom of the coke reaction chamber, 7, and flows upward countercurrent to the coke flow direction. The ashes in the ash removal mechanism, 8, and in the protective ash layer, 10, can thus be cooled by the relatively cold incoming primary air. Such cooling, as the ash is emerging from the coke, can function to limit ash particle fusion and agglomeration into klinkers.

14. A modified mixed fuel coal burner, of this invention, can be used to transform coals, containing volatile matter, into two different fuel products, a clean burning fuel, derived from the coal volatile matter, and a devotalitized coke fuel, derived from the coal fixed carbon. The partially oxidized coal volatile matter, destructively distilled within the ODD reactor chamber, together with the diluents from the hot molecular oxygen containing gas, constitutes the clean burning fuel, which flows out of the upper gas outlet of the ODD reactor chamber and into a receiver or user of such a fuel. The devolatilized coal chunks, pushed out of the upper gas outlet of the ODD reactor, and into a coke collector, during refueling, constitutes the solid coke fuel, which can be utilized elsewhere.

15. An alternatively modified, mixed fuel coal burner, of this invention, utilizes the volatile matter derived fuel as an energy source for a gas turbine engine. The devolatilized coke fuel is removed as a byproduct, for use elsewhere, as in iron melting cupola furnaces, or iron blast furnaces. The devolatilized coke fuel, transferred out of the ODD reactor chamber, passes into a coke receiver, at gas turbine air compressor pressure, and is subsequently sealably transferred, out of the coke receiver chamber, and into a coke collector, by a coke removal mechanism, functionally similar to an ash removal mechanism. The volatile matter derived fuel passes into an ODD overfire burner, as its receiver, and, after mixing with a supply of ODD overfire air, it is ignited and burned to hot burned gases. These hot burned gases, from the ODD overfire burner, flow into the gas turbine inlet, to be admixed with, those portions of the compressor discharge air which bypassed the mixed fuel coal burner, plus any other sources of hot gases.

16. For gas turbine engines driving electric power generators, close control of engine speed is necessary. For this control purpose, a supplementary fuel air mixture generator and burner may be preferred. Such a supplementary fuel air mixture generator system is shown schematically in FIG. 1, and comprises: a source of natural gas, 28, at adequate pressure, with a positive displacement supplementary gas supply meter, 33, a supply of compressor discharge air, via the positive displacement supplementary air supply meter, 29; a generator chamber, 30, to mix this air and natural gas in approximately stoichiometric proportion; a delivery pipe, 31, to deliver this supplementary fuel air mixture into the supplementary overfire burner chamber, 40; and a spark igniter, 32, to ignite the mixture.

I. Description of Elements

17. The several compressor air supply meters, 12, 15, 20, 24, 27, 29, and fuel gas supply meters, 17, 33, are preferably positive displacement meters, with variable speed drivers. Roots blowers, such as described in Reference F, are an example of a suitable positive displacement gas supply meter. Fully controllable air and gas flow rates could be achieved, by use of such Roots blower gas meters, driven by variable speed electric motors, with the air and fuel gas supplied to the gas meter inlet, at a constant pressure, essentially equal to gas turbine engine compressor discharge pressure. The Roots blower meters would be doing very little compressing, only enough to offset gas flow pressure loss through the fuel beds. Reciprocating piston and cylinder displacers are another type of positive displacement air meter or gas meter. Variable speed drivers, such as compressed air motors, could alternatively be used to drive the positive displacement gas and air meters. A controllable speed Roots blower functions as a combined flow rate controller and meter with flow rate being essentially linear in the product of blower displacement per revolution and shaft revolutions per unit time.

When using free burning, non caking, coals, at essentially steady coal burn rates, adjustable flow dampers could alternatively be used to distribute the compressor air flow portions, into the several burners, mixers and reactors. But where caking coals were being used, with consequent variations in coal bed flow resistance, or where coal burn rates varied over a wide range, such flow dampers would require frequent adjustment, and a meter, or other sensor means, to check on flow rates.

18. The refuel mechanism and driver, 3, functions to periodically transfer a refuel quantity of coal, from an external source at atmospheric pressure, into the bottom of the ODD reactor chamber, 2, and to positively force this refuel quantity into the reactor chamber, thus concurrently causing transfer of a coke quantity, from the upper, gas outlet end, 34, of the ODD reactor chamber, into the upper end, 5, of the coke reaction chamber, 7. The refuel mechanism is to carry out this transfer of coal, while keeping the ODD reactor chamber sealed against leakage. The refuel mechanism driver is controlled to thusly intermittently transfer coal, into the ODD reactor chamber, and coke into the coke reaction chamber, in order to maintain an adequate depth of the carbon dioxide burn zone, 25. This controller of the refuel driver is described hereinbelow. Various types of refuel mechanism, and drivers, and controllers, can be used for these purposes in this invention.

An example of a suitable disc or plate type force feed refuel mechanism is described in U.S. Pat. No. 5,485, 812, Firey, 23 Jan. 1996, in FIG. 2, and column 4, lines 16 through 45. For purposes of the present invention, a mask element can be added, between the refuel driver piston, 35, and the reaction chamber, 7, to prevent fuel bed slumping when the driver piston, 35, is retracted at the time of movement of the transfer plate, 33. Also the driver piston, 35, stroke length would be limited to the depth of the refuel cavity, 34. This material from U.S. Pat. No. 5,485,812 is incorporated herein by reference thereto.

Another example of a suitable rotary force feed refuel mechanism is described in U.S. Pat. No. 4,653,436, Firey, 31 Mar. 1987, and this material is also incorporated herein by reference thereto. This rotary force feed mechanism can also be adapted for use as an ash removal mechanism, for purposes of the present invention, as is described in U.S. Pat. No. 4,653,436.

The refuel mechanism driver controller, for the present invention, may differ from the driver controllers described in these referenced US patents.

Another example refuel mechanism is illustrated schematically in cross section in FIGS. 7, and 8, and comprises the following components:

At the lower refuel end, 4, of the ODD reactor chamber, 2, the refuel mechanism, 3, comprises:

(a) The refuel cavity, 47, in the refuel block, 48, can be aligned with the ODD reactor chamber, 2, as shown, or can be aligned with the refill hopper, 49, for refilling with coal chunks, by the refuel block pneumatic driver, 50, acting to thusly slide the refuel block back and forth;

(b) The refuel mask hole, 51, in the refuel mask, 52, can be aligned with the ODD reactor chamber, 2, as shown, or can be non aligned therewith in order to close off the refuel end, 4, of the ODD reactor chamber; The refuel mask is thusly driven back and forth by a mask pneumatic driver similar to the refuel block pneumatic driver;

(c) The refuel piston, 54, is shown fully retracted out of the refuel cavity, 47, and can be driven fully into the refuel cavity, 47, by the refuel piston pneumatic driver, 55, when both the refuel cavity, 47, and the mask hole, 51, are aligned with the ODD reactor chamber, 2;

(d) In this way a refuel package of coal chunks can be transferred, from the refuel hopper, 49, into the refuel end, 4, of the ODD reactor chamber, 2, and retained therein by the refuel mask while the refuel cavity, 47, is being refilled for the next following refuel.

Figure 2:
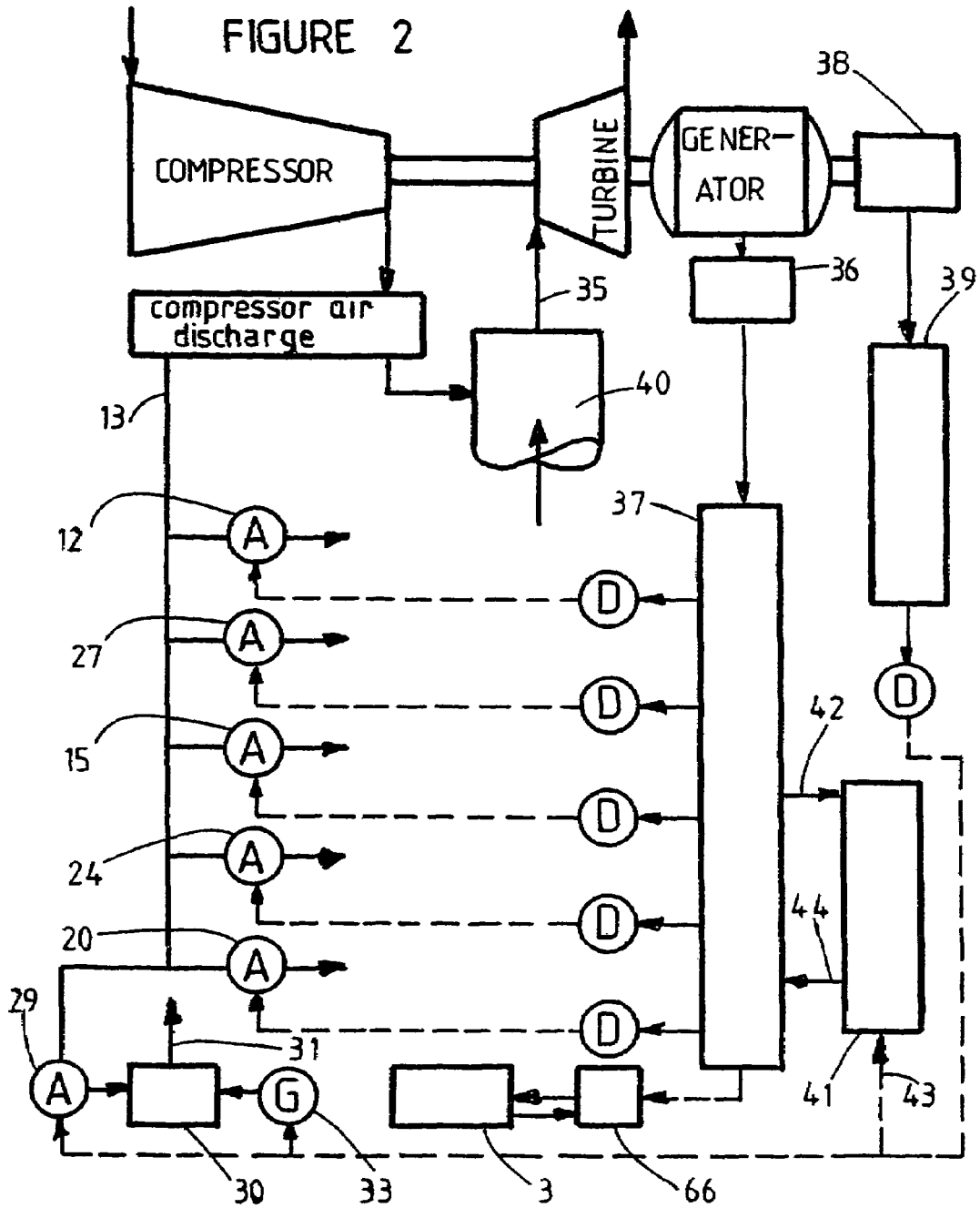
In FIG. 2 an example controller, for controlling a mixed fuel coal burner of this invention, is shown schematically for use on a gas turbine engine.

(e) A coke transfer ram, 56, can be used to force those coal chunks, forced up out of the ODD reactor chamber, 2, during refueling, across into the exit end, 57, of the coke reaction chamber, 7, following after each refueling. The coke transfer ram is thusly driven across, and retracted, by a coke transfer ram pneumatic driver not shown. A coke transfer ram will not be needed for those designs, wherein the angle between the ODD reactor enclosure centerline, and the coke reactor enclosure centerline, is large, as shown in FIG. 1;

(f) The refuel block, the refuel mask, the refuel driver piston, and the coke transfer ram are sealed against leakage and these seals are not shown in these schematic figures;

(g) The several pneumatic drivers, 50, 53, 55, may differ in required driver piston area, and stroke length, but are functionally similar in components, and operation. Details of the refuel block driver, 50, are presented herewith as typical for all drivers:

(i) The driver piston, 59, operates sealably within the driver cylinder, 60, and is connected to the refuel block, 48, via the piston rod, 61;

(ii) Each end of the driver cylinder, 60, can be alternately pressurized or vented, via the values, 62, 63, connecting to a pressure source, 64, or a vent, 65, in order to drive and retract the piston, 59, and hence the refuel block, 48;

(iii) The pressure and vent valves, 62, 63, can be solenoid actuated, if an electrical or electronic refuel controller is used. Other valve actuators, such as hydraulic or pneumatic could alternatively be used;

(h) The operating sequence of the refuel mechanism, at the end of a refuel time interval is as follows:

(i) The mask hole, 51, is aligned to the ODD reactor chamber, 2;

(ii) The refuel piston, 54, drives the refuel package of coal into the ODD reactor chamber, 2;

(iii) The coke transfer ram, 56, crosses the ODD reactor exit, to the coke reactor exit, thus transferring coke fuel, from the ODD reactor chamber, 2, into the coke reaction chamber, 7;

(iv) The coke transfer ram, 56, is fully retracted;

(v) The mask hole, 51, is non aligned to the ODD reactor, 2;

(vi) The refuel piston, 54, is retracted out of the refuel cavity, 47;

(vii) The refuel block, 48, moves the refuel cavity, 47, out of alignment to the ODD reactor chamber, 2, and into alignment with the refill hopper, 49;

(viii) After a refill delay interval, to allow refilling of the refuel cavity, 47, with fresh coal chunks, the refuel block, 48, moves the refuel cavity, 47, out of alignment to the refill hopper, 49, and into alignment to the ODD reactor chamber, 2;

(i) An example electronic coke bed depth control means, 66, for controlling the several solenoid operated valves, 62, 63, on the several drivers, 50, 55, 58, of the refuel mechanism, in order to carry out the above refuel mechanism sequence, at the end of each refuel time interval is shown schematically in FIG. 2. This coke bed depth controller, 66, receives several input signals, from position sensors, on each moving element of the refuel mechanism, 3, and sends output signals to the solenoid actuators of the refuel mechanism valves, 62, 63. The refuel mechanism sequence is initiated by an input to the coke bed depth controller, 66, from the coal controller, 37, as shown in FIG. 2 and described hereinbelow;

19. The ash removal mechanism and driver, 8, functions to periodically transfer a quantity of ashes from the lower ash removal end of the coke reaction chamber, 7, at high pressure, into an external ash receiver at atmospheric pressure. The ash removal mechanism is to carry out this transfer of ashes, while keeping the coke reaction chamber sealed against leakage. The ash removal mechanism driver is controlled to thusly, intermittently, transfer ashes, out of the coke reactor chamber, and into an external ash receiver, only when sufficient ashes collect, at the bottom of the coke reaction chamber that a protective ash layer, 10, remains always present, between the hot burning coke in the oxygen burn zone, 11, and the ash removal mechanism, 8. This ash bed depth controller of the ash removal mechanism driver is described hereinbelow. Various types of ash removal mechanism, and drivers, and controllers, can be used for these purposes in this invention.

An example of a suitable sliding plate type of ash removal mechanism is described is in U.S. Pat. No. 5,613,626, Firey, 25 Mar. 1997, and this material is incorporated herein by reference thereto. The ash removal mechanism driver controller for the present invention may differ from the driver controller described in referenced U.S. Pat. No. 5,613,626. The mechanism, described in U.S. Pat. No. 5,613,626, can also be modified to function as a positive, force feed, refuel mechanism, as described therein on column 7, lines 6 through 44.

The ash removal form of the mechanism, described in U.S. Pat. No. 5,613,626, provides for positive removal of the ash from the ash cavity, 5, by the transfer driver piston, 6, and subsequently also by the dump driver piston, 25. Such positive final dumping of the ashes may be preferred when ash klinkering is a problem, as with those coals having a low ash fusion temperature.

20. Various types of drivers can be used for the driving of the refuel mechanism, 3, and the ash removal mechanism, 8, such as electro-mechanical drivers, wholly mechanical drivers, hydraulic drivers, and pneumatic drivers. In some gas turbine applications pneumatic drivers may be preferred, since high pressure air is readily available from the compressor discharge. Linear or rotary pneumatic drivers can be controlled by solenoid operated valves, or by pneumatically operated valves, the solenoid valves being often preferred when electronic engine governors are used.

The refuel mechanism, 3, when driven through a refuel cycle by the driver, delivers an essentially constant volume of coal into the ODD reactor chamber, 2, on each cycle. The average rate of coal supply into the ODD reactor chamber, can be controlled by adjusting the length of the refuel time interval, (tRF), between refuel cycles, coal supply rate increasing when refuel time interval is shortened. The refuel time interval can be thusly adjusted by the coke bed depth controller, in terms of clock time, or, for constant speed gas turbine engines, in terms of engine shaft revolutions between refuel cycles.

The ash removal mechanism, 8, when driven through an ash removal cycle by the driver, removes an essentially constant volume of ashes from the coke reaction chamber, 7, on each cycle. An example ash bed depth controller, of this ash removal process, senses the ash depth in the coke reaction chamber 7, as by a thermocouple or infrared temperature sensor, and, when ashes accumulate to the sensor depth, and thus reduce the temperature there, initiates an ash removal cycle. The sensor depth is set high enough above the ash removal mechanism, that, after completion of an ash removal cycle, an adequate depth of ash remains to protect the ash removal mechanism from the very hot oxygen burn zone, 11.

21. Various types of oil or gas burners can be used for the ODD burner, 14, and the supplementary fuel air mixer, 30, and overfire burner, 40, as are well known in the prior art of oil and gas burners. Several example descriptions of such prior art oil and gas burners are presented in references G, H, I & J;

The ODD burner, 14, and ODD mixer, 19, can be combined, as is common practice with aircraft gas turbine engine burners and cooling air mixers.

In both the ODD burner, 14, and the supplementary fuel air mixer, 30, the ratio of fuel to air is to remain constant, at somewhat fuel lean from stoichiometric, and the fuel supply meters, 17, 33, and corresponding air supply meters, 15, 29, are to function in this manner. For example, where natural gas fuel is used, with positive displacement air and gas supply meters, a common drive can be used to drive both the fuel meter, and the air meter, at the same speed, with the ratio of meter displacement volumes per revolution being equal to the intended fuel to air ratio.

22. Operating a gas turbine engine simultaneously on two separate fuels, coal and natural gas, will require adjustments of the burn rate of both fuels, when turbine load changes, in order to keep turbine shaft speed within narrow limits. This multifuel governing of turbine speed can be carried out in various ways, one particular example of which is shown schematically in FIG. 2, in combination with FIG. 1, and described as follows:

When gas turbine engine load increases, a load sensor of turbine power output, such as an electric generator wattmeter, 36, or a turbine power output shaft torque meter, could act via a coal controller, 37, to carry out the following control functions:

(a) The flow rates of air; into the coke reaction chamber, 7, via supply air meter, 12; into the carbon monoxide overfire burner, 26, via air supply meter, 27; into ODD burner, 14, via supply air meter, 15; into the ODD mixer, 19, via air supply meter, 20; and into the ODD overfire burner, 23, via air supply meter, 24; are all increased, via their drivers, labeled D on FIG. 2, and the ratios between these air flow quantities and also between these air flow quantities and the fuel flow quantities, remain essentially constant, as long as the same fuels are being burned. Also the flow rate of gas fuel, or liquid fuel, into the ODD burner, 14, via fuel supply meter, 17, is increased in proportion to the flow rate of air thereinto.

(b) The coal burn rate will thus be increased, as needed to increase gas turbine engine power output to equal the increased load. But this response of coal burn rate will be somewhat sluggish, due in part to the intermittency of refuel cycles, and in part to the time required to heat up the freshly refueled coal to an adequate reaction temperature. This sluggish response of coal burn rate could cause undesirable variations in gas turbine engine shaft speed.

(c) A turbine shaft speed sensor, 38, acts via a supplementary air fuel mixture controller, 39, to increase the flow of supplementary fuel air mixture, from the mixer, 30, into the supplementary overfire burner, 40, when shaft speed decreases due to increased load. The resulting increase of energy release will be rapid, since gas or liquid fuel is burned in the supplementary overfire burner, 40, and thus turbine shaft speed can be governed within narrow limits.

(d) A comparator, 41, compares the energy release of the coal burner, via a sensor signal, 42, from the coal controller, 37, to the energy release of the supplementary overfire fuel air mixture, via a sensor signal, 43, from the speed controller, 39, and acts via a comparator output, 44, on the coal controller, 37, to adjust the coal burner energy release, so as to maintain the ratio of coal energy release, to supplementary fuel air mixture energy release, within a narrow band, about a set value, for the energy release rate ratio, ER.

$$(ER) = \frac{(\text{Coal energy Release Rate})}{(\text{Supplementary Fuel Air Mixture Energy Release Rate})}$$

This set value, for the energy release rate ratio, ER, could be adjustable, as by hand, within the comparator, 37, in order to accommodate to changes in relative fuel prices, or availability.

(e) Hunting of this gas turbine engine governor system can be minimized by the width of the narrow band of values, of energy release rate ratio, within which the comparator, 41, acts on the coal controller, 37, to adjust the coal burner burn rate.

23. Within the coke reaction chamber, 7, the carbon dioxide, formed in the oxygen burn zone, 11, is preferably to be largely reacted with the coke, in the carbon dioxide burn zone, 25, to form a coke burner exit gas, rich in carbon monoxide, and low in carbon dioxide. This carbon monoxide rich coke burner exit gas can readily form fully burnable fuel air mixtures, when admixed with overfire air, in the carbon monoxide overfire burn zone, 26. To achieve this preferred result, an adequately deep carbon dioxide burn zone is preferred to provide sufficient coke surface area for the carbon dioxide reaction therewith. A coke fuel depth controller, responsive to a coke fuel bed depth sensor, and operative upon the refuel mechanism driver, 3, can function to maintain an adequately deep carbon dioxide burn zone, 25. Various types of such coke fuel depth controllers can be used. A particular example controller is illustrated schematically in FIG. 3 and FIG. 2 and described as follows:

(a) Several separate optical depth sensors, 45, are placed along a length of the coke reaction chamber, 7, both above and below the desired total coke fuel depth, ZT. These optical sensors send a radiation beam, of shorter wavelength than emitted by the hot burning coke, across the chamber to a receiver of this type of radiation, on the opposite side of the chamber. The total fuel bed depth will be sensed, as less than the lowest such sensor for which the radiation reaches the receiver, and greater than the highest such sensor for which the radiation fails to reach the receiver, being blocked by the coke.

(b) A controller, 66, compares the total coke fuel depth, (Z), thusly sensed, to the desired minimum coke fuel depth, (Zmin), and initiates a refuel cycle, from the refuel mechanism, 3, whenever sensed depth, (Z), is less than minimum desired coke depth, (Zmin).

(c) The controller, 66, also compares the coke fuel depth, (Z), thusly sensed, to the desired maximum coke fuel depth, (Zmax), and suppresses the next refuel cycle, of the refuel mechanism, 3, when called for by the coal controller, 37, when sensed depth, Z, exceeds maximum depth, Zmax.

24. Theoretically, the effective coke fuel bed depth, Z, could be controlled by sensing the carbon monoxide and carbon dioxide, molal fractions, in the coke fuel bed exit gas. The sum of these two molal fractions, corrected for the change in mols of gas flowing through the coke reactor, 7, equals the mols of carbon gasified within the coke reaction chamber, 7, per mol of primary air flowing into the coke reaction chamber, via the primary air meter, 12. As more of the carbon dioxide, formed in the oxygen burn zone, 11, is reacted further with carbon, in a deeper carbon dioxide burn zone, 25, to form increased carbon monoxide, the mols of carbon gasified, per mol of primary air, is thus increased.

This coke bed exit gas composition sensor has the advantage that coke fuel bed depth is automatically compensated for changes in coke fuel chunk size (dCH), and primary air flow rate, ($G_0$). However, drawing a suitable sample of coke fuel bed exit gas, for this composition sensor to analyze, is a difficult problem.

Automatic sensor and control apparatus, as described hereinabove, will usually be preferred, but hand sensor and control methods could also be used, for example in small plants.

25. The coke reaction chamber enclosure, 6, is preferably designed with a useable fuel bed depth, between the ash removal mechanism, 8, and the entry level of coke transfer from the ODD reactor chamber, 2, adequate for the maximum intended primary air flow rate, ($G_0$), and the largest coke fuel chunk size, (dCH), to be used.

26. When a mixed fuel coal burner of this invention is to be shut down, the coke fuel bed, in the coke reaction chamber, 7, is preferably fully burned up while maintaining gas turbine operation on the supplementary fuel air mixture, from the mixer, 30, the refuel mechanism, 3, being rendered inoperative during shut down. During the next following startup, the ODD burner, 14, and mixer, 19, are operated, in order to heat up the coal within the ODD reactor chamber, 2, to at least its devolatilization temperature. The gas turbine is operated, at startup, on the supplementary fuel air mixture from the mixer, 30. When the coal in the ODD reactor chamber, 2, is sufficiently heated, the refuel mechanism, 3, commences operation, in order to transfer thusly heated coke into the coke reaction chamber, 7. In this way the coke reaction, with primary air, can start, as soon as coke and primary air start entering the coke reaction chamber, 7.

27. Various types of containers can be used to enclose the ODD reactor chamber, 2, and the coke reaction chamber, 7. For example, these containers could comprise the following elements:

(a) A high temperature ceramic layer, such as alumina of high density and strength, could be used for an abrasion resistant inner liner, next to the reacting coal and coke.

(b) An insulating ceramic layer, such as a low density alumina, could surround the inner liner.

(c) A cooling air channel could surround the insulating ceramic layer, through which compressor discharge air is passed.

(d) A steel or alloy container could enclose the air channels, and retain the high pressure air and gases; this high pressure metal container would be protected from the high temperatures prevailing in the ODD reactor chamber, and the coke reaction chamber, by the intervening ceramic layers, and the cooling air channel.

28. The mixed fuel coal burner of this invention, shown schematically in FIG. 1, comprises a single ODD reactor chamber, 2, supplying coke into a single coke reaction chamber, 7. But for a gas turbine engine, more than one coke reaction chamber could be used, and each such coke reaction chamber could be supplied by more than one ODD reactor chamber. If two or more ODD reactor chambers are used, for each coke reaction chamber, these could be distributed about the coke reaction chamber, so as to achieve a more nearly uniform distribution of coke across the coke reaction chamber cross sectional area.

29. A wide variety of coal types can be efficiently and cleanly burned in a mixed fuel coal burner of this invention. Free burning coals will often be preferred, where available at low prices. Where caking coals are to be used, a moderate taper of the ODD reactor chamber, 2, could be used, with chamber cross-sectional area increasing in the direction of coal motion.

30. Natural gas fuel is well suited for use as the fuel for the ODD burner, 14, and also for the supplementary fuel air mixer, 30. Distillate liquid petroleum fuels could alternatively be used in one or both of these burners. Other kinds of gas fuels could also be used in these burners.

II. Reactors Sizing

The gas turbine engine type, size, speed, and allowable turbine inlet temperature, will determine the proportion of compressor discharge air available as air flow to the mixed fuel coal burner, at rated gas turbine engine power output. Also determined are the burner operating pressure (PO), the burner air inlet temperature (TA3° R), and the engine thermal efficiency relative to the lower heating value (LHV), of the coal.

The coal properties needed are the coal lower heating value (LHV), the weight fraction volatile matter, (VM), the weight fraction fixed carbon (FC), the weight fraction oxygen, and the weight fraction ash (ASH), by proximate analysis, and the coal density.

The equivalent coal chunk size (dCH), can be preselected as a design variable, or can be measured approximately by a technique described hereinbelow.

For the approximate reactor sizing methods described herein, the rough approximation is made that all coals have an "equivalent" molecular weight of 12, as carbon. This approximation ignores the different burning stoichiometry of the hydrogen and sulfur portion of a coal. However, the resulting design errors are small, since coal hydrogen contents are small.

The coal energy rate per megawatt of gas turbine rated power output (MW), can be calculated:

$$\frac{(\text{Coal Energy, Btu/Hr})}{\text{MW Power Output}} = \frac{(3413000)}{(\text{Energy Efficiency})}$$

And the coal feed rate into the ODD reactor chamber, 2, by the refuel mechanism, 3, can be calculated:

$$\frac{(\text{Coal Burn Rate, lbs/Hr})}{\text{MW Power Output}} = \frac{(3413000)}{(LHV)(\text{Engine Eff.})}$$

$$\frac{(\text{Lb. Mols coal 12})}{(\text{MW Hr})} = (J) = \frac{(284417)}{(LHV)(\text{Engine Eff.})}$$

The fuel for the ODD Burner, 14, and the supplementary overfire burner, 31, is, in this example calculation, assumed to be natural gas, composed largely of methane (CH4), each mol of which requires at least a stoichiometric air flow of 9.52 mols.

A. ODD Reactor Sizing

The ODD burner, 14, and mixer, 19, are to supply a hot gas, containing some molecular oxygen, into the ODD reactor chamber, 2 in order to increase the temperature of the coal therein, from the coal refuel temperature, (To ° R), up to the coal rapid devolatilization temperature (Tcx° R). An energy balance on this overall process yields the following approximate relation for the molal ratio of ODD burner methane to coal:

$$\frac{\text{Mols ODD Burner CH4}}{\text{Mol Coal 12}} = \frac{[(Tcx°R) - (To°R)](0.56)}{[(Tmx°R) - (Tcx°Ra)][10.52 + 4.76\ W]} = (H)$$

$$\frac{\text{lb mols ODD Burner CH4 per Hr}}{\text{MW Power Output}} = \frac{\text{Mols ODD Burner CH4}}{\text{Mol coal 12}} (J)$$

Wherein:

4.76 W=Molal ratio of mixer air, via air meter, 20, to ODD burner CH4, via fuel gas meter, 17, a design variable;.

W=Mols of molecular oxygen in mixer exit gas per mol of ODD burner CH4;

(Tmx° R)=Temperature of hot gas leaving the mixer, 19, and flowing into the ODD reactor chamber, 2; ° R;

$$(Tmx°R) = (TA3°R) + \frac{(344644)}{(10.52 + 4.76\ W)(8.54)}$$

This relation between mixer exit gas temperature, (Tmx° R) and molal ratio of mixer air to ODD burner CH4, is shown graphically on FIG. 6, together with the variation of ODD mixer exit gas molecular oxygen concentration.

(TA3° R)=Gas turbine engine compressor air discharge temperature, ° R;

(Tcx° R)=Temperature at which coal undergoes rapid devolatilization.

The experimental data on rate of coal devolatilization, as a function of coal temperature, and heating gas temperature, presented in reference C, indicate that coal devolatilization is rapid at temperatures at or above 1500° R, and is essentially complete, for very small coal particles, in less than one minute's time. For larger coal chunks, the heat transfer process, from the hot through flow gas, into the coal chunks, is unsteady, the chunk centers being the last to reach a rapid devolatilization temperature, and hence the last to undergo devolatilization. Additionally, for coal chunks, the rate of heat transfer from the hot gas, into the coal, increases as throughflow gas mass velocity (Gf), increases due to thinning of the stagnant gas film on the coal surface. An approximate analysis of this unsteady heat transfer process, using the methods of Gurney and Lurie, as presented in reference D, together with the film heat transfer coefficient relations, for gas to a bed of solid chunks, presented in reference E, indicates that the coal chunk centers reach within 100 degrees Rankine of the adjacent hot gas temperature, in less than about two minutes' time, for hot gas throughflow mass velocities ($G_f$), above about 350 lbsmass, per hour, per square foot, of ODD reactor chamber cross sectional area.

As described hereinbelow, the coal refuel process is intermittent, a refuel time interval, (tRF) intervening between refuel steps. Hence each refuel package of coal chunks remains inside the ODD reactor for at least one refuel time interval. Since refuel time intervals will preferably exceed two minutes, it follows that essentially complete devolatilization of the coal fuel chunks can occur in the ODD reactor chamber during the first refuel time interval.

Devolatilization of the central portions of a coal chunk may take place in the absence of the molecular oxygen needed for partial oxidation to prevent tar and soot formation. Hence the amount of tar and soot may increase as coal chunk size is increased.

The molal air flow rate to the ODD burner, via air supply meter, 15, can be estimated as about 9.52 times the molal CH4 flow rate into the ODD burner, via gas supply meter, 17.

Volatile matter, emerging from the coal chunks in the ODD reactor chamber, 2, during devolatilization, mixes into the hot, molecular oxygen containing gases from the mixer, 19, flowing through the ODD reactor chamber. Thus the emerging volatile matter has first call on the molecular oxygen available in these throughflowing gases. To avoid any possible oxidation of the coke, formed by devolatilization, to ashes while within the ODD reactor chamber, the oxygen available for the coal volatile matter is preferably less than the stoichiometric oxygen, for full burnup of the volatile matter. In this way, only partial oxidation of the volatile matter takes place, and essentially all of the molecular oxygen, in the throughflowing gases, is reacted only with emerging volatile matter. Ash formation is to be avoided, within the ODD reactor chamber, since the small ash particles, emerging at the ODD reactor upper gas exit, can easily be carried into the turbine blades by the throughflowing gas. This preferred operation, of the ODD reactor chamber, can be achieved by controlling the flow of mixer air, into the ODD mixer, 19, to be less than stoichiometric for the flow of coal volatile matter, into the ODD reactor chamber, by refueling.

An approximate energy balance on the ODD reactor chamber, 2, yields the following relations for the coal temperature (Tcx° R), in the chamber:

$$\frac{[(L)(Tmx°R) + (To°R)]}{[1+L]} = (Tcx°R)$$

$$\frac{(10.52 + 4.76\ W)(8.54)}{\left[\frac{(Mols\ Coal\ 12)4.80}{(Mol\ ODD\ Burner\ CH4)}\right]} = (L)$$

$$\frac{Mols\ Coal\ 12}{Mol\ ODD\ Burner\ CH4} = \frac{lbs\ mass\ Coal\ 12}{(12)(Mol\ Burner\ CH4)} = \left(\frac{1}{H}\right)$$

For this ODD reactor chamber energy balance, the approximation is made, that the endothermic heat of reaction of the destructive distillation of the volatile matter, is offset by the exothermic heat of reaction of the partial oxidation of the volatile matter.

The fraction of stoichiometric molecular oxygen flowing through the ODD reactor chamber relative to the flow rate of coal volatile matter can be estimated by the following relations:

(r)=Fraction of stoichiometric molecular oxygen relative to coal volatile matter;

$$(r) = \frac{(W)(H)}{(VM)}$$

Wherein:
(VM)=Weight fraction volatile matter content of coal as devolatilized; can be estimated for sizing purposes from the coal proximate analysis.

An example ODD reactor chamber energy balance result is shown graphically on FIG. 4, for a coal with a volatile matter weight fraction of 0.35, and for a range of values of coal devolatization temperatures, (Tcx° R), and also a range of value of (r), the stoichiometric molecular oxygen fraction.

On this coal, the ODD reactor chamber could be operated at the following example conditions, as shown on FIG. 4:

(Tcx° R)=Coal Rapid devolatilization temperature=1660° R(1200° F.)

(r)=Stoichiometric molecular oxygen fraction=0.40

$$\frac{Mols\ Coal\ 12}{Mol\ ODD\ Burner\ CH4} = 36;\quad \frac{Mols\ Coal\ 12}{MW\ Hr} = (36)(H)(J)$$

$$\frac{Mols\ ODD\ Mixer\ Air}{Mol\ ODD\ Burner\ CH4} = 24;\quad \frac{Mols\ ODD\ Mixer\ Air}{MW\ Hr} = (24)(H)(J)$$

$$\frac{Mols\ ODD\ Mixer\ Air}{Mol\ Coal\ 12} = 0.667$$

Preferably, the ODD reactor chamber is to be operated, with the stoichiometric molecular oxygen fraction less than 1.0, to assure no ash formation within the ODD reactor, as described hereinabove.

At very low values of (r), the desired partial oxidation of the volatile matter may be incomplete, resulting in increased formation of soot and tar. For values of (r) close to stoichiometric, burnup of the volatile matter may be almost completed within the ODD reactor chamber. The subsequent overfire burning, of the small residual unburned volatile matter, may be incomplete, due to excess dilution of the reactants. Hence intermediate values of (r) are preferable, to be selected experimentally, at full overfire burnup of coal volatile matter, with minimum soot and tar.

Whatever soot and tar are formed in the ODD reactor chamber, can be largely removed from the gases flowing through the reactor, by filtering these gases through a deep bed of the coke chunks, produced by the devolatilization process. For this reason, each refuel package of coal chunks preferably remains inside the ODD reactor chamber for several refuel time intervals. The depth of the coal bed, inside the ODD reactor chamber, is thus preferably sufficient to hold at least two refuel packages, and preferably more. With three or more refuel packages, within the ODD reactor chamber, the most recent package can function to insulate the refuel mechanism, by admitting the hot molecular oxygen containing gas well above the refuel mechanism, as shown in FIG. 9.

The longer the coal residence time inside the ODD reactor chamber, the greater the extent of capture of soot and tar, and the more completely these captured products of devolatization are transformed into coke, and subsequently transferred into the coke reaction chamber for complete burnup to $CO_2$.

For preferred filtering of soot and tar, within the ODD reactor chamber, the depth of the ODD reactor (LODDR), is to be essentially a constant, and independent of the refuel package volume, (RCV), or the refuel time interval (tRF).

This depth is another design variable, wherein greater depth yields more complete capture of soot and tar, together with a larger pressure drop through the ODD reactor chamber.

The volume of a cylindrical ODD reactor chamber, (VODDR), can be estimated as follows:

(VODDR)=(AODDR)(LODDOR), ft.$^3$

Wherein:
(AODDR)=ODD reactor chamber cross sectional area, in square feet;
(LODDR)=ODD reactor chamber length up to where the coke is spilled over into the coke reaction chamber, in feet;

Also:
(VODDR)=(RCV)(NRP)
(RCV)=Refuel package volume, ft$^3$
(NRP)=Number of refuel packages within the ODD reactor;

The ODD reactor chamber cross sectional area, (AODDR) can be estimated in terms of the throughflow gas mass velocity ($G_f$), which is a design variable.

(Gf)(AODDR)=(292+138 w)(H)(J)(MW Power Output)

Wherein:
(Gf)=pounds mass flow, per hour, per square foot of ODD reactor chamber cross section area, when empty, of gases flowing through the ODD reactor chamber, excluding the volatile matter flow;

Design values of the throughflow gas mass velocity (Gf), and hence of the ODD reactor chamber cross sectional area (AODDR), can be based on the following considerations:
(a) The gas mass velocity must be well below the chunk lift off velocity, as described hereinbelow, for the coke reaction chamber;
(b) At higher gas mass velocity, heat will transfer more quickly into the coal chunks, and the resulting more rapid devolatization may reduce soot and tar yields, by reducing the residence time of the volatile matter within the interior pores of the coal chunks; but pressure drop through the ODD reactor chamber coal bed will increase, and somewhat reduced gas turbine engine efficiency, will result;
(c) At reduced gas mass velocity, a larger ODD reactor chamber cross sectional area is needed, which invites uneven devolatization, due to uneven gas flow distribution over the cross sectional area. But pressure drop through the ODD reactor coal bed will decrease and gas turbine engine efficiency loss will be reduced;

Tentatively, design values for gas mass velocity (Gf), appear to lie preferably between about 300 lbsmass, per square foot, per hour, and about 1500 lbsmass, per square foot, per hour;

Design values for the refuel package volume (RCV), as well as the refuel time interval (tRF), are more readily determined from the coke reaction chamber sizing, as described hereinbelow.

B. Coke Reaction Chamber Sizing

As primary air flows through the reacting coke fuel bed, the molecular oxygen reacts rapidly with the carbon fuel, by diffusing through a stagnant gas film, to the hot carbon surface. This reaction is rapid, and molecular oxygen is largely depleted within the early portions of the fuel bed, the reaction products being mostly carbon dioxide, with some carbon monoxide. The carbon dioxide subsequently reacts further with the carbon surface, by diffusing back thereto, and forms additional carbon monoxide further along in the fuel bed. The carbon dioxide reaction, with the carbon surface, is appreciably slower than the oxygen reaction therewith. Nevertheless, the early formed carbon dioxide is, in turn, depleted as the gases flow further through the fuel bed. The gases, leaving the fuel bed, may thus contain carbon monoxide, and some carbon dioxide, plus nitrogen, with only trace amounts of surviving molecular oxygen.

In an equilibrium coke fuel bed, all of the fuel, supplied to the top of the coke reaction chamber, from the exit of the ODD reactor chamber, is gasified, and only ashes remain at the bottom of the coke reaction chamber. Thus coke feed rate, into the coke reaction chamber, is to equal carbon gasification rate therein. This carbon gasification rate is proportional to the rate at which molecular oxygen is supplied into the coke reaction chamber by the primary air, supplied via the positive displacement primary air supply meter, 12. As primary air flow rate, $G_0$, is increased, the stagnant gas film on the carbon surface becomes thinner, and both molecular oxygen and carbon dioxide react more rapidly with the carbon.

Two differing reaction zones are thus created within the reacting coke fuel bed: an oxygen burn zone, 11, where molecular oxygen in the primary air reacts rapidly with carbon, to form largely carbon dioxide, with some carbon monoxide; and a carbon dioxide reaction zone, 25, where the carbon dioxide, from the oxygen burn zone, reacts further with carbon, to form additional carbon monoxide. These two reaction zones overlap in part. The carbon dioxide reaction, while slower than the rapid oxygen reaction, is nevertheless rather fast, the endothermic heat of the carbon dioxide reaction being supplied by heat transfer to the coal chunks from the very hot gases, flowing out of the oxygen burn zone.

For efficient combustion, all of the carbon monoxide, formed inside the coke reaction chamber, 7, is to be burned further to carbon dioxide, in a carbon monoxide overfire burner, 26, supplied with overfire air via the carbon monoxide overfire air supply meter, 27.

As the coke reaction chamber exit gas carbon monoxide concentration is decreased, a weaker carbon monoxide plus air overfire flame results. With room temperature reactants, a carbon monoxide in air flame becomes non-burnable at molal diluent ratios (DRCO), greater than about 0.55, as described in reference B. This dimensionless molal diluent ratio can be described as follows:

$$(DRCO) = \frac{(\text{Diluent gases})}{(\text{Diluent gases}) + (\text{Air For CO Burnup})}$$

The nitrogen and carbon dioxide, in the coke reaction chamber exit gases, are the principal diluents, and the carbon monoxide overfire air, supplied via carbon monoxide overfire air supply meter, 27, is the air for CO burnup. At elevated gas temperature, the carbon monoxide flame, being less chilled, becomes burnable at diluent ratios greater than 0.55, but the relation of usable diluent ratio to gas temperature is not well established.

Herein, the conservative sizing assumption is illustrated, that a molal diluent ratio no greater than about 0.55 is used, for the carbon monoxide overfire burner, 26, and that the coke fuel bed, in the coke reaction chamber, is to be sufficiently deep to react most of the diluent carbon dioxide into carbon monoxide, in order to achieve this diluent ratio.

Some bituminous coals break up, during devolatization, into smaller coal chunks. As a result the coal chunk equivalent diameter (dCHE), within the coke reactor, may be one half, or one fourth, or less, of the coal chunk diameter (dCH), as refueled into the ODD reactor chamber. These smaller coal chunks offer a greater surface area for the molecular oxygen and carbon dioxide reactions, which thus occur more rapidly, and a shallower coke fuel bed will be adequate to meet the diluent ratio requirement.

Herein, the additional conservative sizing assumption is illustrated, that the coke chunk equivalent diameter (dCHE) is the same as the coal chunk diameter (dCH), for sizing the coke fuel bed depth, within the coke reaction chamber. The resulting design coke fuel bed depth will be adequate for coals which do not break up on devolatization, and will be more than adequate for those coals which break up into smaller chunks.

The relations of, fuel bed exit gas composition, mols carbon gasified per mol of primary air, and diluent ratio of the coke fuel bed exit gas at overfire, obtained by approximate analysis of this model of the fuel bed reactions, are plotted graphically in FIG. 5, against fuel bed depth factor (bm)(z);

Wherein:

$$\left(\frac{PO_2}{PO}\right) = 0.21[e^{-aZ}] = \text{Mol Fraction Molecular } O_2$$

$$\left(\frac{PCO_2}{PO}\right) = 0.21\left[\frac{a}{a-bm}\right][e^{-bmZ} - e^{-aZ}] = \text{Mol Fraction } CO_2$$

$$\left(\frac{PCO}{PO}\right) = 0.42\left[1 - \left(\frac{a}{a-bm}\right)e^{-bmZ} + \left(\frac{bm}{a-bm}\right)e^{-aZ}\right] = \text{Mol Fraction } CO$$

(PO)=Compressor discharge pressure;

$$(z) = \text{Dimensionless fuel bed depth} = \frac{Z}{dCHE}$$

(dCHE)=Fuel chunk equivalent diameter in the coke reactor; ft.
(Z)=Fuel bed depth in same dimensions as the fuel chunk diameter;
(a)=Dimensionless diffusion and reaction factor for the molecular oxygen reaction with carbon surface;
(bm)=Dimensionless diffusion and reaction factor for the carbon dioxide reaction with carbon surface $$(a) \cong \frac{3.375}{(ReO)^{0.3}}$$

$$(bm) \cong (0.315)(a)$$

$$(ReO) \cong (9.46)(G_0)(dCHE)$$

= Coke Reaction Chamber Grate Reynolds Number ($G_0$) Primary air mass velocity through coke reaction chamber grate, when empty, lbsmass air, per hour, per square foot grate area;

$$\frac{\text{Mols Carbon Gasified}}{\text{Mol Primary Air}} \cong \left[\left(\frac{PCO_2}{PO}\right) + \left(\frac{PCO}{PO}\right)\right]$$

These analytical results, shown in FIG. 5, agree reasonably well with experimental results, such as are presented in reference A, even though the mol fractions were not corrected for the changes in total number of mols, due to reaction.

The preferred operating range, for the coke reaction chamber, shown in FIG. 5, lies between a fuel bed depth factor (bm)(z), of about 1.6, at the diluent ratio limit for carbon monoxide burnability at overfire, and a fuel bed depth factor about 3 to 4, at the carbon dioxide depletion limit, hence:

$$1.6 < (bm)(z) < 4.0$$

Within this preferred coke reaction chamber operating range, the carbon gasification rate is roughly constant, at about 0.40, as shown in FIG. 5:

$$0.35 < \frac{\text{Mols Carbon Gasif.}}{\text{Mol Primary Air}} < 0.42$$

The reacting fuel bed depth (Z), in feet, can be calculated in terms of the fuel bed depth factor (bm)(z):

$$(Z) \cong (1.84)(bmz)(G_0)^{0.3}(dCHE, \text{ft.})^{1.3}; \text{ ft.}$$

$$(Zmin) > (1.84)(1.60)(G_0)^{0.3}(dCHE, \text{ft.})^{1.3}; \text{ ft.}$$

$$(Zmax) < (1.84)(4.0)(G_0)^{0.3}(dCHE, \text{ft.})^{1.3}; \text{ ft.}$$

The coke fuel bed total depth, (ZT), is to exceed these reacting bed depths, by an additional ash bed depth, (ABD4), as described hereinbelow.

The maximum refuel quantity volume, (RCV) should be less than the product of coke reaction chamber grate area, (GAR), times the maximum change of reacting fuel bed depth:

$$(RCV) < [(Zmax) - (Zmin)](GAR), \text{ in ft.}^3$$

The required total coke reaction chamber grate area, (GAR) is related to the primary air mass velocity ($G_0$), the carbon gasification rate, and the gas turbine power output (MW), as follows:

$$\frac{GAR}{\text{MW Power Output}} = \frac{(284417)(29)(FCC)}{(LHV)(\text{Engine Eff})(G_0)(0.40)}; \frac{\text{ft.}^2}{\text{MW}}$$

Wherein:
(GAR)=Total coke reaction chamber grate area, Ft.$^2$;
(FCC)=Fractional fixed carbon content of the coal as reacted; approximately equal to proximate analysis fixed carbon;
($G_0$)=Primary air mass velocity through empty grate, lbsmass per square ft. per hr;

$$\frac{\text{Mols Carbon Gasified}}{\text{Mol Primary Air}} \cong 0.40$$

The refuel quantity (RCV), and refuel time interval (tRF), are related to the gas turbine engine power output as follows:

$$\frac{(RCV)}{(tRF)} = \frac{(284417)(MW\ Power)}{(LHV)(Engine\ Eff)(df)(5)(PF)}$$

Wherein:
(RCV)=Volume of total refuel quantity in cubic feet;
(tRF)=Refuel time interval between refuel processes, mins.;
(df)=Coal fuel density, lbsmass per cubic foot;

For reactor sizing purposes, the refuel quantity, and refuel time interval, are selected for maximum gas turbine engine power output. At reduced power output, longer refuel time intervals are used, with a constant refuel quantity.

The internal volume of the coke reaction chamber, 7, is to at least equal the product of grate area (GAR), and the total maximum coke fuel bed depth, (ZTmax)=[(Zmax)+ABD4)];

The net ash removal rate is necessarily related to the coal refuel rate, and the coal ash content, as follows:

$$\frac{(RCV)}{(tRF)}(df)(PF)(Coal\ wt.\ Fraction\ Ash) = \frac{(ARV)}{(tAR)}(da)(PF)$$

Hence:

$$\frac{(ARV)}{(RCV)} = \frac{(df)(tAR)}{(da)(tRF)}(Coal\ wt\ Fraction\ Ash)$$

Wherein:
(ARV)=Ash removal cavity, 8, volume;
(da)=Ash density;
(tAR)=Ash removal time interval;

The packing factor, (PF), is assumed equal for both coal particles and ash particles;

For the common case, where the ash removal cavity, 8, is fully aligned with the coke reaction chamber, the cross sectional area of the cavity, will equal the cross sectional area of the grate, (GAR).

To protect the ash removal mechanism, from the high temperature of the oxygen burn zone, 11, in the fuel bed, the minimum ash bed depth, (ABD3), is to exceed the ash removal cavity depth, $$\frac{ARV}{GAR},$$

by a protective ash bed layer, 10, of thickness, (PABD).

Current experience with coal stokers indicates that a protective ash bed layer of as little as one or two inches is adequate.

During each ash removal interval, ash accumulates above the minimum ash bed depth (ABD3), up to the maximum ash bed depth (ABD4), at which depth the ash bed depth sensor initiates an ash removal process, which returns the ash bed depth to its minimum value (ABD3), by removing an ash volume of (ARV). Hence:

$$(ABD_4) = (Maximum\ Ash\ Bed\ Depth) = (2)\left(\frac{ARV}{GAR}\right) + (PABD)$$

The primary air mass velocity, $(G_0)$, through the coke reaction chamber grate area, is limited to less than the lift off mass velocity (GLO), at which coke chunks start to lift off the fuel bed. Design limiting values for (GLO) can be estimated from the following approximate relation:

$$(GLO) = \sqrt{(dfx)(PF)(dCHE)(3.2 \times 10^6)}$$

Wherein:
(GLO)=Air mass velocity, in lbsmass, per hour, per square foot of grate area, at incipient lift off;
(dfx)=Coke chunk density at fuel bed gas exit, in lbsmass per cubic foot;
(PF)=Coke chunk packing factor=0.74;
(dCHE)=Coke chunk equivalent diameter, in feet, at fuel bed gas exit;

The coke density at fuel bed gas exit (dfx), can be estimated as the coal density, reduced by the volatile matter removed in the ODD reactor;

$$(dfx) = (df)(1 - VMP)$$

(VMP)=coal volatile matter weight fraction;

The coal chunk equivalent diameter, (dCHE), can be estimated as the coal chunk original diameter, (dCH), divided by the number of fragments, (FRAG), into which the coal chunk breaks up during devolatilization.

$$(dCHE) = \frac{(dCH)}{(FRAG)}$$

An example calculation, of limiting air mass velocity (GLO), for a typical bituminous coal, is shown on FIG. 10 for several values of fragmentation factor (FRAG), and coal chunk starting size (dCH). For this particular coal, design values of coal chunk size of one inch or greater, can be selected, with air mass velocities up to about 1000 lbsmass per hour per square foot of grate area, or more.

Where several separate coke reaction chambers are used, on a single gas turbine engine, and each of these separate coke reaction chambers receive coke from several separate ODD reactor chambers, the total refuel quantities, and air and gas flow quantities, will usually be equally divided among these several reactors. Multiple coke reaction chambers could have separate multiple overfire burners, or, alternatively, a single combined overfire burner could receive exit gases, from these several coke reaction chambers and all of their connected ODD reactor chambers.

C. Overfire Burners Sizing

A mixed fuel coal burner of this invention, will use at least two overfire burners. In the ODD overfire burner, the partially oxidized volatile matter, emerging from the ODD reactor chamber exit, is mixed with ODD overfire air, and ignited and burned, largely to CO2 and $H_2O$. In the carbon monoxide overfire burner the coke reaction chamber exit gases, containing carbon monoxide are mixed with carbon monoxide overfire air and ignited and burned largely to $CO_2$ and $H_2O$. In this way the coal supplied to the reactors, is finally completely burned, as desired for high engine efficiency, and these burned gases flow into the turbine inlet nozzles, together with that compressor discharge air which bypassed the mixed fuel coal burner.

In many applications of mixed fuel coal burners, an additional supplementary overfire burner may be preferred, in order to assure close speed and load governing of the gas turbine engine. In this supplementary overfire burner, a supplementary fuel, such as natural gas, or distillate petroleum fuel, is mixed with supplementary overfire air, and ignited and burned in the supplementary overfire burner.

1. ODD Overfire Burner Sizing

ODD overfire air flow rate via air meter, 24, per megawatt of gas turbine engine power output, can be estimated as follows, for stoichiometric volatile matter burnup:

$$\frac{(Lbmols \text{ } ODD \text{ Overfire Air/Hr})}{(MW \text{ Power Output})} = (H)(J)(K)$$

Wherein:

$$(K) = (4.76)[(VMC12) - (w) - (\text{Coal } O_2)]$$

$$(VMC12) = \left(\frac{VMP}{H}\right)$$

(VMP)=coal volatile matter weight fraction, as reacted in the ODD reactor chamber.

(VMP) can be approximated as coal volatile matter weight fraction, from proximate analysis;

$$(\text{Coal } O_2) = \frac{(\text{coal } wt. \text{ Fraction } O_2)(12)}{(32)(H)}$$

2. Carbon Monoxide Overfire Burner Sizing

Where the coke reaction chamber, 7, is operated within the preferred range, with (bm)(z), greater than 1.6, and less than about 4.0, the stoichiometric carbon monoxide overfire air, supplied via the air supply meter, 27, can be estimated as follows:

$$\frac{(Lb. \text{ Mols Overfire Air For CO Burnup})}{(MW \text{ Hr})} = (2.38)(FCC)(J)$$

Wherein:

(FCC)=coal fixed carbon weight fraction as reacted, approximately equal to weight fraction fixed carbon by proximate analysis;

3. Supplementary Overfire Burner Sizing

For many applications of mixed fuel coal burners, the supplementary overfire burner is preferably sized to supply all of the energy required by the gas turbine engine, and can be adjusted over the full range, to supplying none of this energy. In this way either coal or natural gas can be the principal energy supplier for the engine.

$$\frac{(Lb. \text{ Mols supplementary Overfire CH}_4)}{(MW \text{ Hr})} \cong \frac{(9.903)}{(\text{Engine } \textit{Eff})}$$

Each mol of supplementary overfire CH4, supplied via gas meter, 33, will need a stoichiometric flow of 9.52 mols of supplementary overfire air, supplied via air meter, 29.

D. Example Sizing Calculation

The following calculated results were obtained for a 25 MW gas turbine engine:

1. Gas turbine; 23 to 1 pressure ratio, 0.50 engine efficiency;
2. Bituminous coal; LHV—12350 Btu per lbsmass, 0.35 volatile matter, 0.55 fixed carbon, coal devolatilization temperature, 1200° F., coal chunk diam.=1.25 ins.;
3. Selected operating conditions; Rated load, (r)=0.4 fraction of stoichiometric molecular oxygen in ODD reactor;
4. Calculated operating conditions:
   (a) lbsmass coal per hour=13825 lbs/Hr.
   (b) ODD burner methane—511 lbsmass/Hr.
   (c) ODD burner air—8816 lbsmass/Hr.
   (d) ODD mixer air=22230 lbsmass/Hr.
   (e) Coke reaction chamber, max. coke bed depth—3.1. ft. Min. Coke bed depth—1.23 ft.
   (f) Primary air=45920 lbsmass/Hr.
   (g) ODD overfire burner air=33459 lbsmass/Hr.
   (h) CO overfire burner air=43750 lbsmass/Hr.
5. Reactor Dimensions:
   (a) ODD reactor chamber cross section area=31.5 sq. ft. At Gf=1000 lbsmass, per Hr., per sq. ft.;
   (b) Coke reaction chamber cross section area=45.9 sq. ft. At $G_0$=1000 lbsmass per Hr., per sq. ft.;
6. For a supplementary overfire burner capable of supplying the entire energy requirements:
   (a) Supplementary Overfire CH4=7924 lbsmass/hr
   (b) Supplementary Overfire Air=136700 lbsmass/Hr.

This same 25 MW gas turbine engine, and coal, would use a somewhat different ODD reactor size and operation, if the fraction of stoichiometric oxygen for volatile matter burnup, (r), were reduced to 0.2, as shown by the following calculated sizes, and operating conditions, for the ODD reactor:

(a) lbsmass coal per hour=14022 lbsmas per hr;
(b) ODD burner methane=435 lbsmass per hr.;
(c) ODD burner air=7501 lbsmass per hr.;
(d) ODD mixer air=11819 lbsmass per hr.;
(e) ODD overfire burner air=43817 lbsmass per hr.;
(f) ODD reactor chamber cross section area becomes 19.75 sq. ft. at Gf=1000 lbsmass per hour, per square ft;

The coke reactor dimensions and operating conditions are unchanged.

E. Measurement of Coal Reaction Properties

Analysis of coke reaction chamber exit gas composition, at one or more values of coke fuel bed depth, with overfire air briefly stopped, could provide experimental values for the reaction rate factors, (a), and (bm). With these data, obtained over a range of values of primary air flow rate, $G_0$, the coke bed reaction properties could be experimentally determined.

Coal chunk diameter, (dCH), can be approximated, if screened, as the average of the screen sizes. For unscreened coal, or where chunk size varies widely, a light oil holdup versus time test, can be used to compare a coal against spherical chunks of known diameter.

III. Industrial Uses for the Invention

A strong economic incentive exists to use low cost coal, in place of high cost natural gas, in gas turbine engine driven electric generators, As of October 2004, coal cost, per unit of energy, is about one fifth of the natural gas cost per unit of energy.

The mixed fuel coal burner, of this invention, describes apparatus, and a process, for clean burning of coal, in gas turbine engines, without ash particle carryover into the turbine blades.

At current fuel prices, as of October 2004, a fuel cost savings of about three cents per kilowatt hour can be realized by substituting coal for natural gas, in a gas turbine electric generator, such as a combined cycle plant.

A modified mixed fuel coal burner of this invention could be used in cupola furnaces for melting cast iron or iron blast furnaces. The mixed fuel coal reactor creates two different fuel products from the coal, a clean burning fuel, derived from the coal volatile matter, and a coke fuel, derived from the coal fixed carbon. The coke fuel would be used in the cupola furnace, and the volatile matter derived fuel could be used as the energy source for a gas turbine, or piston engine, driving the air blower for the cupola furnace.

By adding limestone into the original coal, the sulfur oxides, formed from the coal sulfur content, and the nitrogen oxides, formed from the coal nitrogen content, can be captured, in the deep coke fuel bed of the coke reaction chamber. In this way undesirable emissions of sulfur and nitrogen oxides can be reduced.

A gas turbine engine, using a mixed fuel coal burner of this invention, could be the electric power generator for a total energy system, to heat homes and factories cleanly, with low cost coal, instead of the high cost natural gas, or petroleum distillate, fuels currently used.

Having thus described my invention, what I claim is:

1. A mixed fuel coal burner, for the clean and controllable burning of coals containing volatile matter, and without ash being carried over with the burned gases leaving the burner, and comprising:
  a source of coal chunks containing volatile matter, and at atmospheric pressure;
  a source of compressed air at a pressure greater than atmospheric;
  an ash receiver at atmospheric pressure;
  a receiver of hot burned gases;
  an ODD reactor chamber and enclosure, and comprising a lower refuel end, a gas inlet near said refuel end, and an upper gas and coke outlet end;
  a coke reaction chamber and enclosure, and comprising a lower ash removal end, a gas inlet near said ash removal end, and an upper gas outlet end;
  said gas and coke outlet end of said ODD reactor chamber connecting into said gas outlet end of said coke reaction chamber;
  an overfire burner enclosure comprising at least two overfire burner chambers: an ODD overfire burner chamber, connected to said upper gas and coke outlet end of said ODD reactor chamber; and a carbon monoxide overfire burner chamber connected to said upper gas outlet end of said coke reaction chamber; and further comprising igniter means for igniting fuel in air mixtures within said overfire burner chambers; and further comprising a gas outlet into said receiver of hot burned gases;
  a refuel mechanism means for sealably transferring a refuel quantity of coal chunks, from said source of coal chunks, into said lower refuel end of said ODD reactor chamber, repeatedly, at refuel time intervals, so that said ODD reactor chamber is largely filled with a bed of said coal chunks, and so that said coal chunks move through said ODD reactor chamber toward said upper gas outlet end, and pass into the connected upper gas outlet end of said coke reaction chamber, to create a bed of hot coke chunks within said coke reaction chamber;
  whereby a flow of coal chunks, and associated coal volatile matter, is created, passing through said ODD reactor chamber;
  an ash removal mechanism means for sealably transferring an ash removal quantity of coal ashes, from said lower ash removal end of said coke reaction chamber, into said ash receiver, periodically, at ash removal time intervals;
  wherein the depth, of said ODD reactor chamber, is sufficient to contain at least three refuel quantities within said reactor chamber;
  wherein the depth of said coke reaction chamber, between said ash removal mechanism and said upper gas outlet, is sufficient to contain more than six layers of coke chunks, within said coke reaction chamber, in addition to a layer of ashes above the ash removal mechanism;
  hot gas generator means for creating a flow of hot molecular oxygen-containing gas, through said bed of coal chunks, within said ODD reactor chamber, said hot gas comprising, a portion of diluent gases, such as nitrogen, or carbon dioxide, or steam, or combinations thereof, and a portion of molecular oxygen, so that the molecular oxygen mol fraction in said hot molecular oxygen containing gas is less than the molecular oxygen mol fraction in air at sea level, and so that the flow of molecular oxygen, into said ODD reactor chamber, is less than stoichiometric relative to the flow of coal volatile matter, into said ODD reactor chamber, and further so that the temperature of said hot molecular oxygen containing gas at least equals the rapid devolatization temperature of said coal chunks;
  wherein said flow of hot molecular oxygen containing gas is connected into the gas inlet end of the said ODD reactor chamber;
  whereby oxidative, destructive, distillation of the coal chunks, within said ODD reactor chamber, takes place, and creates two coal derived products, a hot devolatilized coke, which enters the connected upper gas outlet end of said coke reaction chamber, and a partially oxidized volatile matter product, which flows into said connected ODD overfire burner chamber accompanied by the diluent portions of said hot molecular oxygen containing gas;
  ODD overfire burner compressed air supply means for supplying a flow of compressed air, from said source of compressed air, into said ODD overfire burner;
  whereby a flowing, and ignitable, fuel air mixture is created within said ODD overfire burner and can be ignited by said igniter means and burned to hot burned gases;
  coke bed depth sensor means for sensing the depth of the coke chunk bed, above the ash layer, in said coke reaction chamber;
  coke bed depth control means, responsive to said coke bed depth sensor means, and operative to adjust said refuel time interval, of said refuel mechanism, so that the coke fuel bed depth, within said coke reaction chamber, exceeds six layers of coal chunks, and remains below the gas outlet end of said coke reaction chamber, by increasing the length of said refuel time interval when the coke bed depth approaches the gas outlet end, and by decreasing the length of said refuel time interval when the coke bed depth approaches six layers of coal chunks;

wherein said coke bed depth sensor and control means can be hand sensor and control means or automatic sensor and control means, or combinations of hand and automatic sensor and control means;

a coke reaction chamber air supply means for creating a flow of primary compressed air, from said source of compressed air, into said lower gas inlet end of said coke reaction chamber, and through said bed of hot coke chunks therein, so that: said hot coke reacts with molecular oxygen in the primary air, and is gasified into gaseous carbon monoxide and carbon dioxide and solid ashes, and said coke chunks and ashes move down through said coke reaction chamber, toward said ash removal mechanism, and in a direction opposite to the direction of primary air flow;

and said ashes are essentially fully separated from said coke and collect near the lower gas inlet end of said coke reaction chamber; and said carbon monoxide and carbon dioxide gases, together with diluent nitrogen gas from said primary air, flow from said upper gas outlet end of said coke reaction chamber and into said connected carbon monoxide overfire burner;

carbon monoxide overfire burner compressed air supply means for supplying a flow of compressed air from said source of compressed air into said carbon monoxide overfire burner;

whereby a flow of ignitable fuel air mixture is created within said carbon monoxide overfire burner and can be ignited by said igniter means and burned to hot burned gases;

said hot burned gases from said ODD overfire burner and from said carbon monoxide overfire burner flow into said connected receiver of hot burned gases;

ash bed depth sensor means for sensing the depth of the ashes, collected at the lower ash removal end of the coke reaction chamber, above the ash removal mechanism, ash bed depth control means, responsive to said ash bed depth sensor means, and operative to adjust said ash removal time interval, of said ash removal mechanism, so that; the ash volume within said coke reaction chamber, and outside said ash removal mechanism, always exceeds the ash removal volume of said ash removal mechanism; and further so that; the ash volume within said coke reaction chamber, and outside said ash removal mechanism, is preferably no greater than three times the ash removal volume of said ash removal mechanism;

wherein said ash bed depth sensor and control means can be hand sensor and control means, or automatic sensor and control means, or combinations of hand and automatic sensor and control means;

whereby a layer of ashes is always present between said ash removal mechanism and said hot burning coke.

2. A mixed fuel coal burner as described in claim 1:

wherein none of said coal chunks will pass through a one half inch screen;

wherein said receiver of hot burned gases is the inlet to the expander turbine portion of a gas turbine engine;

wherein said source of compressed air is a portion of the compressor discharge air from the compressor portion of said gas turbine engine.

3. A mixed fuel coal burner as described in claim 2:

wherein said hot gas generator means comprises:

a source of gas or liquid fuel at a pressure at least equal to the pressure of said source of compressed air;

an ODD burner chamber and enclosure comprising two inlets, an outlet end, and an igniter means;

an ODD burner fuel meter means for creating a flow of fuel from said source of gas or liquid fuel, into one said inlet of said ODD burner chamber;

an ODD burner air supply means for creating a flow of compressed air, from said source of compressed air into the other said inlet of said ODD burner chamber;

wherein the ratio of said flow of compressed air to said flow of fuel is within the spark ignitable limits;

whereby ignition and burning of said fuel and air occurs within said ODD burner chamber and creates a flow of hot burned gases through said outlet of said ODD burner chamber;

an ODD mixer chamber and enclosure comprising two inlets and an outlet, one of said inlets connecting to the outlet of said ODD burner chamber, the outlet of said mixer chamber connecting to said gas inlet of said ODD reactor chamber;

an ODD mixer air supply means for creating a flow of compressed air from said source of compressed air into the other said inlet of said ODD mixer chamber;

whereby said hot burned gas, from said ODD burner chamber, is mixed with air, in said ODD mixer chamber, to create a hot, molecular oxygen containing, gas, which flows into and through said connected ODD reactor chamber, to cause oxidative, destructive, distillation of the coal volatile matter to take place therein;

wherein the ratio of the flow of hot burned gases, from said ODD burner, to mixer air flow, into said ODD mixer, is set to create a molecular oxygen mol fraction, within the hot molecular oxygen containing mixer exit gases, less than the mol fraction of molecular oxygen in air at sea level;

and further wherein the flow of molecular oxygen, via said hot molecular oxygen containing gas, into said ODD reactor chamber is less than stoichiometric relative to the flow of coal volatile matter into said ODD reactor chamber;

wherein said overfire burner chamber, and enclosure, further comprises a supplementary overfire burner chamber, and igniter means;

and further comprising supplementary fuel air mixture generator means for creating a flow of supplementary, ignitable, fuel air mixture into said supplementary overfire burner chamber, and comprising:

a generator chamber comprising two separate generator inlets, and a generator outlet connecting into said supplementary overfire burner chamber;

a supplementary fuel meter means for creating a flow of fuel, from said source of gas or liquid fuel, into one said generator inlet;

a supplementary air supply means for creating a flow of compressed air, from said source of compressed air, into the other said generator inlet;

wherein the fuel in air mixture, thusly created within said generator chamber, is ignitable, and flows into said supplementary overfire burner chamber, and is ignited and burned therein to burned gases;

and further comprising:

a speed sensor means for sensing gas turbine engine shaft rotational speed;

supplementary air fuel mixture control means for controlling the rate of flow of supplementary fuel air mixture, into said supplementary overfire burner chamber, responsive to said speed sensor means, and operative upon said supplementary fuel air mixture generator means, so that, said flow of supplementary fuel air mixture is increased, when gas turbine engine shaft speed is less than a preset value, and so that said flow of supplementary fuel air mixture is decreased, when gas turbine engine shaft speed is greater than said preset value;

whereby gas turbine engine shaft speed is maintained within a narrow range about said preset value;

a load sensor means for sensing gas turbine engine load;

coal control means for controlling the rate of coal burning in said mixed fuel coal burner, responsive to said load sensor means, and operative upon: said hot molecular oxygen containing gas generator means; said coke reaction chamber air supply means; said ODD overfire burner compressed air supply means; said carbon monoxide overfire burner compressed air supply means; so that: the flow rate of hot molecular oxygen containing gas into said ODD reactor chamber, and the flow rate of primary air into said coke reaction chamber, and the flow rate of compressed air into said ODD overfire burner, and the flow rate of compressed air into said carbon monoxide overfire burner, are all changed in proportion to gas turbine engine load;

whereby the rate of coal burning is controlled, by said coal control means, so as to be proportional to gas turbine engine load;

comparator means for comparing the rate of coal burning, as controlled by said coal control means, to the rate of supplementary fuel air mixture burning, as controlled by said supplementary air fuel mixture control means, to determine the ratio of coal energy release rate divided by the supplementary air fuel mixture energy release rate, and to compare this ratio to a preset value for this ratio, and operative upon said coal control means, to increase said coal burning rate when said determined ratio is less than said preset value, and to decrease said coal burning rate when said determined ratio exceeds said preset value.

4. A mixed fuel coal burner, as described in claim 3:

wherein said compressed air supply means are positive displacement air meters.

5. A mixed fuel coal burner, as described in claim 1:

wherein said hot gas generator means comprises:
 a source of gas or liquid fuel at a pressure at least equal to the pressure of said source of compressed air;
 an ODD burner chamber and enclosure, comprising two inlets, an outlet end, and an igniter means;
 an ODD burner fuel meter means for creating a flow of fuel, from said source of gas or liquid fuel, into one said inlet of said ODD burner chamber;
 an ODD burner air supply means for creating a flow of compressed air, from said source of compressed air into the other said inlet of said ODD burner chamber;
 wherein the ratio of said flow of compressed air to said flow of fuel is within the spark ignitable limits;
 whereby ignition and burning of said fuel and air occurs within said ODD burner chamber and creates a flow of hot burned gases through said outlet of said ODD burner chamber;
 an ODD mixer chamber and enclosure comprising two inlets and an outlet, one of said inlets connecting to the outlet of said ODD burner chamber, the outlet of said mixer chamber connecting to said gas inlet of said ODD reactor chamber;
 an ODD mixer air supply means for creating a flow of compressed air from said source of compressed air into the other said inlet of said ODD mixer chamber;
 whereby said hot burned gas, from said ODD burner chamber, is mixed with air, in said ODD mixer chamber, to create a hot molecular oxygen containing, gas, which flows into and through said connected ODD reactor chamber, to cause oxidative destructive, distillation of the coal volatile matter to take place therein;
 wherein the ratio of the flow of hot burned gases, from said ODD burner, to mixer air flow, into said ODD mixer, is set to create a molecular oxygen mol fraction, within the hot molecular oxygen containing mixer exit gases, less than the mol fraction of molecular oxygen in air at sea level;
 and further wherein the flow of molecular oxygen, via said hot molecular oxygen containing gas, into said ODD reactor chamber is less than stoichiometric relative to the flow of coal volatile matter into said ODD reactor chamber.

6. A mixed fuel coal burner as described in claim 5:

wherein said overfire burner chamber, and enclosure, further comprises a supplementary overfire burner chamber, and igniter means;

and further comprising supplementary fuel in air mixture generator means for creating a flow of supplementary, ignitable, fuel air mixture into said supplementary overfire burner chamber, and comprising:
 a generator chamber comprising two separate generator inlets, and a generator outlet connecting into said supplementary overfire burner chamber;
 a supplementary fuel meter means for creating a flow of fuel, from said source of gas or liquid fuel, into one said generator inlet;
 a supplementary air supply means for creating a flow of compressed air, from said source of compressed air, into the other said generator inlet;
 wherein the fuel in air mixture, thusly created within said generator chamber, is ignitable, and flows into said supplementary overfire burner chamber, and is ignited and burned therein to burned gases.

* * * * *